(12) United States Patent
Baldwin et al.

(10) Patent No.: US 7,338,090 B2
(45) Date of Patent: Mar. 4, 2008

(54) HIGH PRESSURE REINFORCED RUBBER HOSE SWAGE OR CRIMPED COUPLING AND METHOD OF ATTACHMENT

(76) Inventors: Gardner T. Baldwin, P.O. Box 230014, Houston, TX (US) 77223-0014; Victor J. DeLeon, P.O. Box 230014, Houston, TX (US) 77223-0014; Larry M. Sweeney, P.O. Box 230014, Houston, TX (US) 77223-0014

( * ) Notice: Subject to any disclaimer, the term of this patent is extended or adjusted under 35 U.S.C. 154(b) by 0 days.

(21) Appl. No.: 10/429,156

(22) Filed: May 2, 2003

(65) Prior Publication Data

US 2003/0205898 A1 Nov. 6, 2003

Related U.S. Application Data

(60) Provisional application No. 60/377,393, filed on May 3, 2002.

(51) Int. Cl.
*F16L 33/00* (2006.01)

(52) U.S. Cl. ........................ 285/256; 285/382

(58) Field of Classification Search ............... 285/256, 285/148.16, 382, 382.7, 222.1–222.5, 257–259, 285/382.4; 29/508
See application file for complete search history.

(56) References Cited

U.S. PATENT DOCUMENTS

| | | | |
|---|---|---|---|
| 3,073,629 A | 1/1963 | DeMarco | |
| 3,165,338 A | 1/1965 | Moss | |
| 3,347,571 A * | 10/1967 | New | 285/222.4 |
| 3,540,486 A | 11/1970 | Flounders | |
| 4,106,526 A | 8/1978 | Szentmihaly | |
| 4,142,554 A * | 3/1979 | Washkewicz et al. | 285/148.16 |
| 4,366,841 A | 1/1983 | Currie et al. | |
| 4,369,992 A | 1/1983 | Fournier et al. | |
| 4,407,532 A | 10/1983 | Patel et al. | |
| 4,498,691 A * | 2/1985 | Cooke | 285/256 |
| 4,544,187 A | 10/1985 | Smith | |
| 4,548,430 A | 10/1985 | Haubert et al. | |
| 4,564,223 A | 1/1986 | Burrington | |
| 4,684,157 A | 8/1987 | Smith | |

(Continued)

FOREIGN PATENT DOCUMENTS

DE 2001098 * 8/1970 ................. 285/256

(Continued)

OTHER PUBLICATIONS

George Myer Catalog—showing current state of the art in swaged and crimped end connectors for industrial hose published in Jan. 2000.

*Primary Examiner*—Aaron Dunwoody
(74) *Attorney, Agent, or Firm*—C. W. Alworth

(57) ABSTRACT

Swage end-connector for high pressure reinforced flexible hose particularly suitable in the petrochemical and drilling industries for hoses. Two connectors are disclosed one for intermediate hose pressure burst ratings up to 12,500 psi and internal diameters up to 3½ inches and higher hose pressure burst ratings up to 18,750 psi and internal diameters up to 4 inches. Both embodiment connectors will withstand the rated burst pressure of the hose to which they are connected and will withstand a pump-off force that exceeds the burst pressure of the hose. That is, the hose will fail before the connector pops off the hose.

23 Claims, 20 Drawing Sheets

U.S. PATENT DOCUMENTS

| | | | |
|---|---|---|---|
| 5,190,323 A * | 3/1993 | Oetiker | 285/256 |
| 5,199,751 A | 4/1993 | Beagle et al. | |
| 5,255,944 A * | 10/1993 | Blin et al. | 285/222.2 |
| 5,317,799 A | 6/1994 | Chapman et al. | |
| 5,344,196 A | 9/1994 | Kozuka et al. | |
| 5,382,059 A | 1/1995 | Wilson | |
| 5,487,570 A | 1/1996 | Wilson | |
| 5,607,191 A | 3/1997 | Wilson | |
| 5,782,270 A * | 7/1998 | Goett et al. | 138/109 |

FOREIGN PATENT DOCUMENTS

| | | | |
|---|---|---|---|
| DE | 2423347 | * 12/1974 | 285/256 |
| FR | 846548 | * 9/1939 | 285/256 |
| FR | 932488 | * 3/1948 | 285/256 |
| FR | 1419827 | * 10/1965 | 285/256 |
| GB | 1294132 | * 10/1972 | 285/256 |
| JP | 300594 | * 12/1990 | 285/256 |

* cited by examiner

PRIOR ART

PRIOR ART

PRIOR ART

PRIOR ART

PRIOR ART

HIGH PRESSURE REINFORCED RUBBER HOSE SWAGE OR CRIMPED COUPLING AND METHOD OF ATTACHMENT

This application claims the benefit of U.S. Provisional Application No. 60/377,393, filed on May 3, 2002.

TECHNICAL FIELD OF THE INVENTION

The present invention relates generally to the reinforced rubber hose industry and in particular to swaged or crimped hose couplings used to terminate high pressure flexible reinforced rubber hose used particularly in the energy, marine, petrochemical industry and other industries.

BACKGROUND OF THE INVENTION

High-pressure rubber hose is used in many instances in industry but particularly in the mining, construction, energy, marine and petrochemical industries. Flexible rubber hose is used to transfer fluids under various pressures and temperature between two points, one or both of which, may move relative to each other or to another fixed point in space. Piping at the two points is generally metal (or some other form of fixed conduit) and the flexible hose must attach to the piping at both ends. This requires a coupling on each end of the hose.

In the drilling industry, a flexible rubber hose runs between the pump piping system on the rig and the kelly that is coupled to the rotating drill string. The pump system forces drilling fluid down the center of the drill pipe, and back through the wellbore, in order to flush cuttings from the wellbore (plus providing wellbore stability, etc.). In this instance, the flexible hose is subjected to high pressures. The high pressure is required to both transfer drilling fluid into the wellbore and overcome static return head pressures—the deeper the wellbore, the higher the pressure.

The rotary drilling hose is subject to further stress in that it hangs down within the derrick supported at either end by the metal coupling on the hose and the fact that the kelly is moved up and down literally thousands of times during the drilling operation. This means that the hose is subject to stress at the metal coupling (in addition to being subject to stress throughout its length). Thus, a highly reliable bonding between the hose and the coupling is required for protection of personnel and equipment. If the hose breaks loose from the coupling, it could easily fall and cause severe damage on the drill floor of the rig. In a similar manner, if the hose breaks, circulation may be lost resulting in a well blowout situation.

In order to obtain a high-pressure flexible rubber hose (the term rubber is used generally and does not specifically mean natural occurring rubber gum), a hose manufacturer incorporates a reinforcing material. Thus, the hose will consist of an inside sealing membrane—the fluid tight element, an inner rubber element, a reinforcing element, an outer rubber element, and finally some sort of abrasive resistant covering. The reinforcing element can be polyester or similar organic material, carbon fiber or similar high technology material or metal (steel) generally in the form of wire or cable. The reinforcement generally is used in multiple layers called "plys" And usually made of steel.

There are four types of reinforcing employed by the hose manufacturer that is set down in even layers—i.e., 2 layers, 4 layers, 6 layers, etc., and a grading systems are used to specify burst pressures for hose. For example, in the rotary drilling industry, grade C hose has a minimum burst pressure of 10,000 psi, grade D hose has a minimum burst pressure of 12,500 psi and grade E hose has a minimum (guaranteed) burst pressure of 18,750 psi. Grade C and D hose are 2 ply hose, although there is some 4 ply D hose. Most grade E hose is 4 ply. Swage end connectors are currently available for two ply hose and therefore the burst pressure range for C and D hoses is covered by the current art.

Generally a hose manufacturer manufactures flexible hoses to specific order by the purchaser who specifies length, diameter, pressure, service ratings and required end connections. These flexible hoses are generally referred to as a "hose assembly with end connectors." This term is used throughout the industry.

It takes time to manufacture a hose assembly with end connections and often such a hose is needed almost immediately by industry. In order to service this demand a separate industry termed the local market distributor has evolved. The local market distributor keeps bulk reinforced hose—hose without connectors—in inventory. The purchaser would specify the hose requirements—diameter, length, pressure rating and end connectors—to the local market distributor. The local market distributor then takes bulk reinforced rubber hose from inventory, cuts the hose to required length, and places a coupling on each end of the hose. Bulk hose is available in varying lengths from a hose manufacturer, and the actual bulk length (between 90 and 110 feet) will depend on the mandrel used by the manufacturer.

The resulting hose is called a SWAGED or CRIMPED HOSE, depending on the method used to "place" the end connector onto the hose, where the term "place" is being used to include both swaging and/or crimping operations. It should be noted that swaging and crimping accomplish similar end results.

The current state of the art in swaged (or crimped) connectors has evolved to using an outer ferrule with lands (internal ridges) that are compressed around the end of a reinforced hose about a stem that is inserted into the end of the hose. The stem may or may not have barbs that are meant to improve the "grip" between the hose and the end connector. Often, the outer layer of hose rubber is "skived" which means that the outer layer of rubber is removed exposing the reinforcement (although some local distributors do not skive).

The reinforced hose is actually held in the end connector by the ridges of the ferrule gripping the reinforcement via compression of the hose against the stem. The compression operation (swaging or crimping) of the ferrule against the reinforcement and against the inner stem creates severe stress and strain within the rubber of the hose and in particular the reinforcement.

It is known that multiple ply-reinforced hose may contain manufacturing defects (actually all reinforced hose may contain defects). During manufacture a ply may be out of position. That is, rather than lie next to each other a void (filled of course with rubber) may exist between the plys; the plys may be off-center; or, one or more cables may stand out (i.e., be slightly above the other cables). These defects can cause failure, if the defect is within or near the confines of the swaged or crimped connection.

The reason for the failure is relatively simple and relates back to stress imposed on the plys by the end connector. If a cable or ply is out of place, that element will be compressed more than the other elements. This additional compression puts more stress on the out-of-place reinforcement that can result in failure.

Development of high pressure swaged end connectors for rubber hose has extended over a period of years and the art runs the gauntlet from low temperature and/or low pressure to high temperature and/or high pressure applications. The hose diameters range from fractional inches (fractional centimeters) to tens of inches (fractional meters) and the manufacturers/providers of connectors realize that the pump-off force on the fitting is proportional to the inside diameter of the hose and the applied pressure.

For example, Marco (U.S. Pat. No. 3,073,629) discloses a low temperature end connector designed to clamp about the helical reinforcing employed with a particular type of hose used in cryogenics. Marco employs the standard ferrule and stem used throughout the industry while shaping the two parts to interact with the helical reinforcing. Moss (U.S. Pat. No. 3,165,388) discloses a device directly intended to resolve pump-off experienced with flexible hoses under various temperatures and pressure. Moss uses the standard two-part connector and discloses a ferrule that is designed to bite into the outer fabric of the hose therefore using stress to retain the hose within the connector. Moss further discloses a mandrel that is inserted in the stem during the swaging operation to keep the internal hose from being damaged.

Most of the art uses a serrated stem that has backward facing teeth that grips the inner liner of the hose to retain the stem in the hose. Much of the art also uses a series of lands (ridges) within the ferrule that bite into the outer layer of the hose and the reinforcement and supposedly causes the teeth (or barbs) of the stem to bite further into the inner lining. (See Moss above.) Some art realizes that stress in the hose should be avoided and Flounders (U.S. Pat. No. 3,540,486) proposes a smooth ferrule that extends the stress over a larger area; however, Flounders relies on a serrated stem to hold the connector on the hose.

Szentmihaly (U.S. Pat. No. 4,106,526) looks at stress in the hose itself and proposes a connector that is designed to allow expansion chambers within the ferrule to accept the excess elastomeric (rubber) flow caused when the connector is crimped about the hose and utilize that flow to hold the connector in place. Szentmihaly teaches that narrow extrusion gaps with parabolic shaped expansion chambers will substantially prevent extrusion of the elastomer liner in hose in the axial direction. The narrow extrusion gap (less than 60-thousandths of an inch) and the associated expansion chambers prevent elastomer flow during the crimping operation thereby making the elastomer behave as if it is incompressible. Szentmihaly further teaches that the radial movement of the ferrule will cause the ferrule to move the hose reinforcement to follow the shape of the expansion chambers thereby forcing the elastomer into the chambers. At no point does Szentmihaly discuss axial movement and distortion that would occur in large diameter fittings which require extrusion gaps very much larger than 60-thousandths.

Fourier et al. disclose a specially shaped ferrule and stem designed to first screw onto the hose and then be swaged onto the hose. Again the device holds the connector in place by gripping the elastomer of the hose. Similar art may be found in Smith (U.S. Pat. Nos. 4,544,187 and 4,684,157), Chapman et al. (U.S. Pat. No. 5,317,799), Beagle et al. (U.S. Pat. No. 5,199,751) and Haubert et al. (U.S. Pat. No. 4,548,430—an interesting three part device).

In order to grip the hose more securely the art currently uses lands or ridges within the outer ferrule to grip the reinforcement found within high pressure hose. The hose can be skived (the outer layer of the hose removed to expose the reinforcement under the fitting) or not skived. Currie et al. (U.S. Pat. No. 4,366,841) modifies the well known art by supplying a series of backward facing lands on ferrule that face the same direction as the serrations on the stem that will penetrate the hose, grip the reinforcement, distort to the shape of the hose and thereby hold the hose in place. Patel et al. (U.S. Pat. No. 4,407,532) is concerned with the force required to swage (crimp) the ferrule and proposes a device that grips the hose reinforcement with a ferrule that has reduced material thereby reducing the crimping force.

Wilson (U.S. Pat. Nos. 5,382,059; 5,487,570 and 5,607,191) proposes a grooved stem with ridges that is designed to better accept the crimping force that is transferred through the hose to the inner stem. The grooved stem allows for expansion of the elastomer into the grooves thereby reducing the force transferred to the stem and utilizes a hoop structure to further reinforce the stem. The device uses standard ridges in the ferrule that may grip the hose reinforcement. Kozuka et al. (U.S. Pat. No. 5,344,196) disclose a serrated stem with an annular groove that receives the expanded rubber (elastomer) thereby providing a better grip on the inner rubber liner. The outer ferrule is internally smooth before crimping; however, when it is crimped the resulting series of grooves are used to act as lands thereby further gripping the rubber. Other variations use a ridged ferrule. The shape of the ferrule serves no particular function but to act as a method of gripping the rubber.

Burrington (U.S. Pat. No. 4,564,223) proposes a device which has ridges in both the ferrule and the stem. The ferrule differs little from the prior art; however, Burrington discloses at least one ridge on the stem that is opposite to a corresponding ridge on the ferrule. Thus when the Burrington device is crimped or swaged the opposite ridges produce a pincher-like grip on the reinforcement which bites into the reinforcement. It should be apparent that device can cause great stress in the reinforcement.

Thus, there remains a need for swaged or crimped hose end connectors that will extend the range of diameter and pressure applications for swaged (or crimped) hose, that will work with rotary drilling hoses and other industry hose, that will work with multiple ply spiral cable or wire plys, that will work with most types of reinforcement, that will compete with integral end connections, that will reduce or eliminate stress points in the reinforcement and that will accept a reasonable range of defective, but safe, hose.

SUMMARY OF THE INVENTION

The instant invention consists of a "waved" ferrule and stem that joins an end connector to flexible reinforced rubber hose. The ferrule and stem are welded together at the coupling end leaving an opening, which accepts the reinforced rubber (elastomer) hose in almost the same manner as a normal "ridged" ferrule and "barbed" stem fitting. Rather than having straight sides, the lands of the ferrule and high points of the stem have a sinusoidal shape—wave. The wave pattern has the appearance of ripples on a pond caused by throwing a stone into the water.

The invention locks all the plys of hose reinforcement inside the end connector, between the stem and ferrule, in a sine wave compressed against the ferrule and the stem to give the fitting an overall strength that is in excess of the strength of the free standing hose (without end connectors) whether or not the hose is under pressure. Grade E hose has a minimum burst pressure of 18,750 psi; thus the instant device, when used with grade E hose will have an overall strength greater than 18,750 psi. (At these pressures the pump-off forces involved reach or exceed 240,000 pound-$s_{force}$ depending on the cross sectional areas.) The invention carefully considers the material forming the ferrule and stem and the relative movement of those materials while attaching the end connector to the hose along with the unpredictable qualities of rubber and flexible hose construction to minimize induced stress in the hose reinforcement. All of these factors, including the sinusoidal shape of the ferrule and stem and the preferred two-step method of attachment (internal expansion of the stem followed by external swaging of the ferrule), operate together to form the instant invention.

This summary will discuss a rotary high-pressure hose end connector embodiment that is made from steel for use with preferably skived steel reinforced rubber hose. It is known in the prior art that the relative axial movement between the ferrule and the stem during a swaging (or crimping) operation causes stress and strain on the reinforcement and can cause the reinforcement to pull (or tear) away from the rubber hose. The instant invention minimizes the relative axial movement between these two parts by using high tensile strength steels, minimizing the radial thickness of the stem and ferrule at the critical cross-sections (subject to design limits), and minimizing the pre-expansion and compression clearances between the ferrule ID and the hose OD. The invention substantially reduces or eliminates stress and strain in the reinforced hose and results in a device that will exceed the burst strength of the reinforced hose.

The un-swaged ferrule lands (or high points) are not aligned with the un-expanded corresponding grooves (or low points) on the stem; however, the ferrule lands (or high points) and corresponding grooves (or low points) on the stem will align exactly after first preferably internally expanding the stem (by pulling a die having a greater diameter than the internal diameter of the stem, but less than the internal diameter of the hose back through the stem) and secondly externally swaging the ferrule. Similarly the stem flutes (or high points) will align with the ferrule nodes (or low points) thus obtaining the highest possible lock between the hose reinforcement and the connector without over stressing the reinforcement and without pulling the reinforcement away from the rubber hose.

The instant invention is inserted into and over a skived reinforced rubber hose with an optional copper sleeve inserted between the wire reinforcement and the waved-ferrule. The optional copper sleeve acts as a lubricant and as a barrier to prevent abrading action between the metal ferrule and the wire reinforcement, and it is optionally used to help guarantee a proper swage. At the time of drafting this disclosure experiments are being conducted without skiving as it is thought that the wave technique will cause the required interaction between the ferrule/stem and reinforcing wire. It is known that local distributors do not like to skive hose and it is believed that non-skived grades C and D hose will perform well in the instant device.

The inner stem is first preferably expanded internally within the hose so that the stem grooves move slightly into the bore of the hose. The high points or flutes will move into the bore of the hose and exert a force against the inner most reinforcing plys. Care must be taken in designing the height of the flutes so that when the flutes move into the tube, they will not overstress the inner carcass and reinforcement. Unlike earlier art that used internal expansion to SEAL the internal diameter of the rubber hose to the stem and compress the hose into the ferrule, this device uses internal expansion to help first cause the reinforcement plys to ease into alignment with the lands and nodes of the ferrule and the flutes and grooves of the stem: after which the ferrule is swaged. This action means that, during ferrule swaging, the internally expanded stem will assist both the innermost reinforcement ply(s) and outermost reinforcement ply(s), remember that plys occur in pairs, into a tightly compressed wave pattern bound between the ferrule and stem.

The outer ferrule is then swaged onto the reinforcement to firmly attach the coupling to the hose. The swaging operation is done deliberately so that the bond between the reinforcing wire and rubber inside ($1^{st}$ carcass) is maintained. Thus, the ferrule lands are driven down into the reinforcement. As the compressing action of the swaging operation proceeds, the waved lands and flutes cause the metal reinforcement, tube and $1^{st}$ carcass to "roll" or wave into the nodes of the ferrule and grooves of the stem passing over the lands of the ferrule and flutes of the stem resulting in the highest possible lock between the swaged end connector and the overall hose.

The invention assures that the local market distributor may custom manufacture reinforced rubber hose assemblies, using swaged end connections that meet or exceed the strength the hose. The invention extends the range of diameter and pressure applications for swaged hose and extends the number of reinforcing plys that may be held by such connectors particularly cable plys. Further the instant device works with rotary grade C, D and E hoses as well as other high pressure hose. It interacts well with multiple ply spiral cable reinforcement, multiple ply wire reinforcement, fabric and other reinforcement methods. It reduces or eliminates stress points in the reinforcing cable, wire plys or such. Finally, the invention will accept some hidden defects (a cable out of line or reinforcing off center) often found in reinforced rubber (elastomer) hose.

In overall summary, the instant invention utilizes a sinusoidal wave-like lock within a ferrule and stem to lock the reinforcement plys and the hose into the end connector by compressing the hose and reinforcement between the waved ferrule and waved stem. Stress and strain on the reinforcement and the tendency for the reinforcement to tear (or pull away) from the rubber hose is minimized by carefully reducing the relative axial displacement between the ferrule and stem that always occurs during the attachment operation. The relative axial displacement is minimized by using high tensile strength steels, minimum un-attached clearances between the hose and end connector, and careful design of the node, lands grooves and flutes to cause a sine like wave while minimizing the radial thickness of the stem and ferrule at the critical cross-sections and considering the resulting strength of the attached fitting.

DETAILED DESCRIPTION OF THE EMBODIMENT

In order to understand the instant invention and how it is a substantial improvement over the current art, it is necessary to understand the structure and properties of reinforced rubber hose and the prior art of swaging metal couplings onto reinforced rubber hoses.

Figure 1:
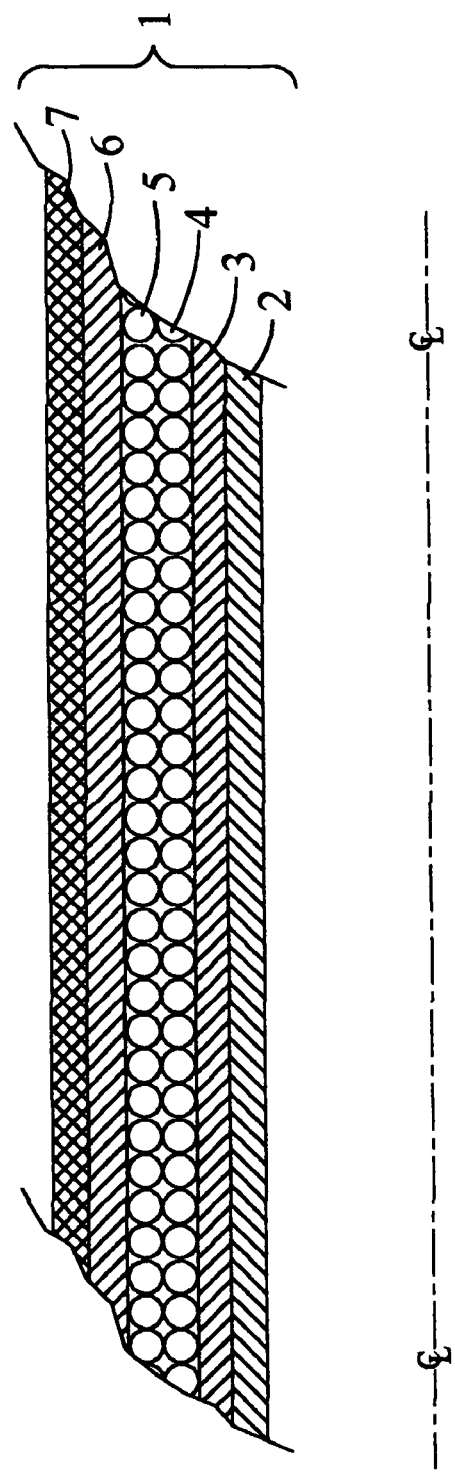
FIG. 1 is a cross-sectional view of a typical reinforced rubber hose.

In order to obtain a high-pressure flexible rubber hose (the term rubber, or elastomer, is used generally and does not specifically mean natural occurring rubber gum), a hose manufacturer incorporates a reinforcing material. Referring to FIG. 1, the reinforced hose, 1, will typically consist of an inside sealing membrane, 2—the fluid tight element, an inner rubber element, 3, a reinforcing element(s), 4 and 5, an outer rubber element, 6, and finally some sort of abrasive resistant covering, 7. The reinforcing element can be polyester or similar organic material or metal generally in the form of steel wire or cable.

Figure 2:
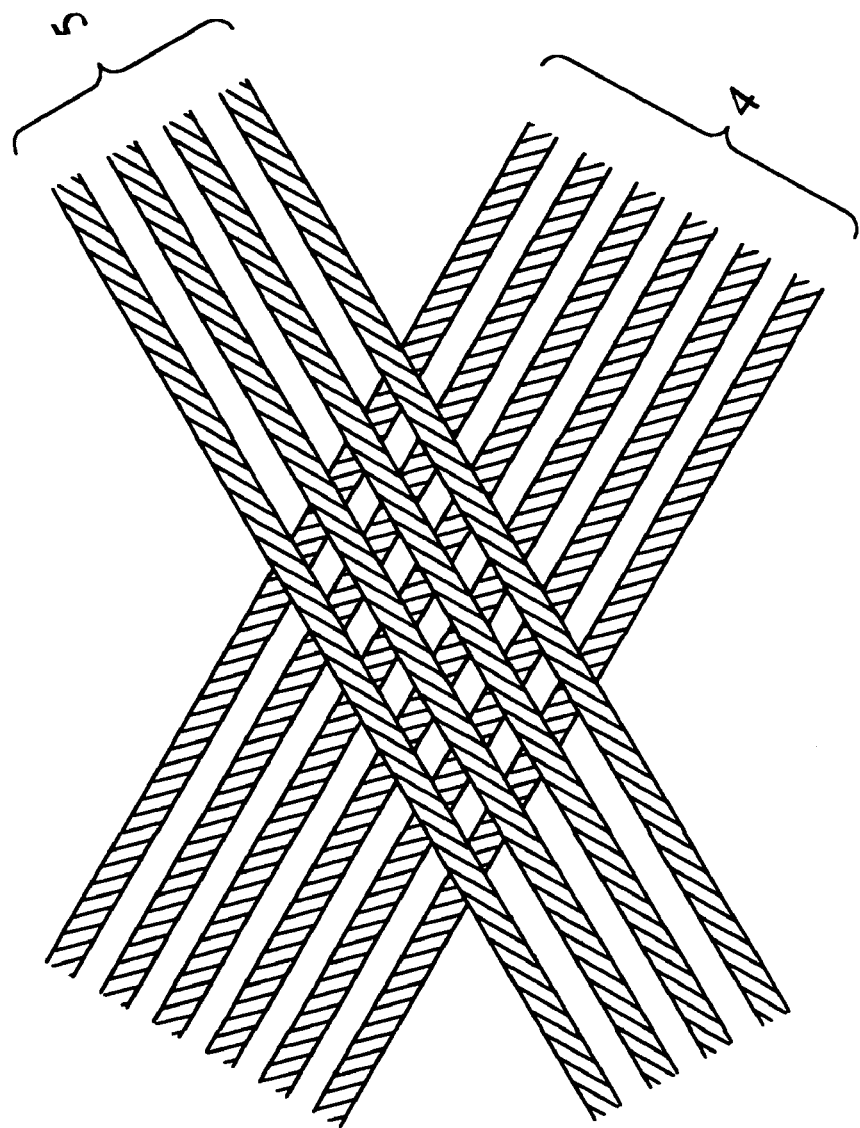
FIG. 2 shows a typical spiral wire-reinforcing weave.

As can be seen in FIG. 2 the layers of reinforcement are formed at an angle to each other. If a braided reinforcement were to be used, each of the reinforcing wires would be interwoven with each other. I.e., one wire would pass over then under an intersecting wire.

Figure 3:
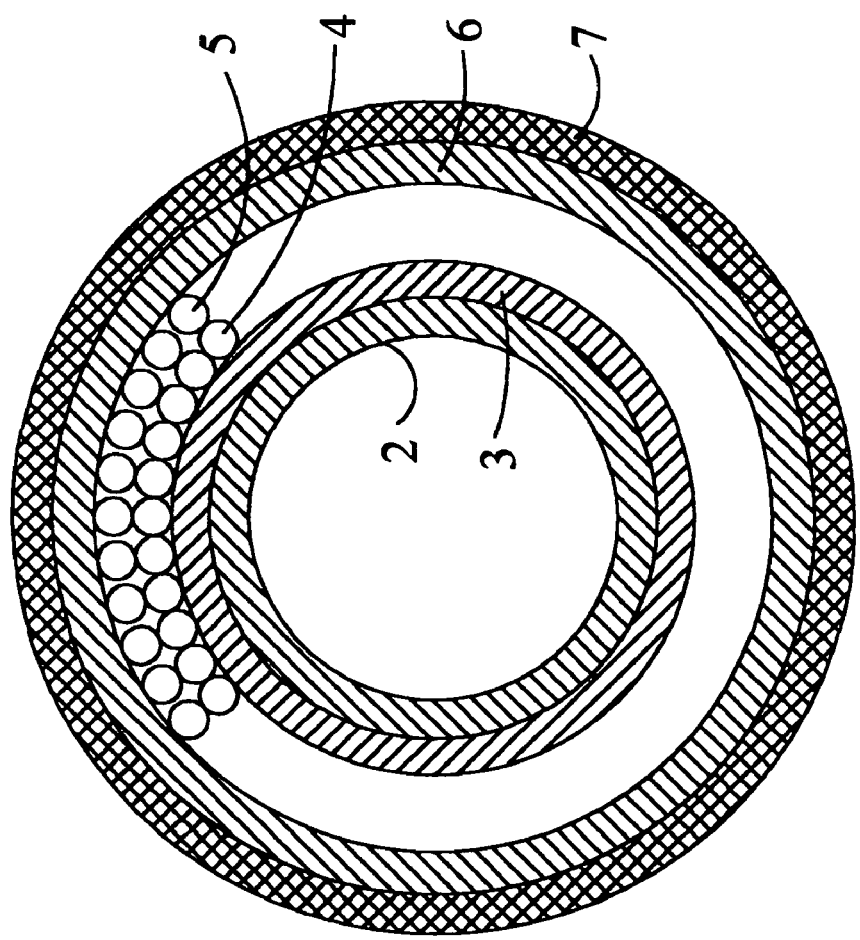
FIG. 3 is a cross-sectional view of a typical reinforced high-pressure rubber hose showing and defining the multiple layers of the hose.

FIG. 3 shows a cross-section of typical two-ply cable reinforced rubber hose. It comprises an innermost portion, 2, called the "tube", followed by first rubber membrane, 3, called the "first ($1^{st}$) carcass". The reinforcement plys, 4 and 5, are placed over the $1^{st}$ carcass. A further rubber membrane, 6, is added over the reinforcing wires, mainly to protect the high tensile strength wires or cable and is called the "second ($2^{nd}$) carcass." Finally some sort of outer hard covering, 7, is formed about the $2^{nd}$ carcass and is called the "outer cover."

There are four types of reinforcing employed by the hose manufacturer (beyond that used within the carcasses themselves). These are, in no particular order, spiral wrapped wire (single strand metal wire or similar reinforcement), spiral wrapped cable (steel, carbon fiber and the like), interwoven mesh and fabric. Spiral wrapping always is applied in even layers—i.e., 2 layers, 4 layers, 6 layers, etc.—that are commonly called plys. Experience has shown the plys should cross at an angle of about 54-degrees to the axis of the hose, which tends to stabilize the hose when it is subjected to pressure. (Other angles may be used.)

The burst strength of the produced hose is primarily set by the strength of the reinforcement and secondarily by the strength of the first carcass. The manufacturer has several choices to increase strength. One—increase the diameter of the reinforcing element (single wire or cable). Two—increase the number reinforcing plys or the number of elements in the cable. Three—increase the strength of the first carcass and to some extent the second carcass. All techniques are used separately and together. The net effect is to increase the thickness of the reinforced hose thereby making it more difficult to bind a swaged end connector to the hose.

Generally a hose manufacturer manufactures flexible hoses to specific order by the purchaser who specifies length, diameter, pressure, service ratings and required end connections. These flexible hoses are generally referred to as a "hose assembly with end connectors." This term is used throughout the industry.

In a built up hose assembly with end connections, the manufacturer, during the course of manufacturing terminates the rubber hose into a metal fitting (the end connector) as specified by the purchaser. Thus, the manufacturer would make the inner rubber membrane ($1^{st}$ Carcass) and its associated inner seal layer (tube) and terminate this assembly in the end connector. The manufacturer would then add the wire reinforcement, as needed, terminating each reinforcing wire (or cable) in the end connector. Two techniques are typically employed by hose manufacturers for terminating the wire reinforcing in or on the end connector itself but are beyond the scope of this discussion. Finally the outer rubber layer ($_2$nd Carcass) and outer cover (cover) would be formed about the reinforcing wire or cable and the overall product vulcanized to achieve a cohesive product.

It takes time to schedule and manufacture a hose assembly with end connections and often a hose is needed almost immediately by industry. In order to service this demand, a separate industry termed the local market distributor has evolved. The purchaser would specify the hose requirements—diameter, length, pressure rating and type of end connectors—to the local market distributor. The local market distributor then takes bulk reinforced rubber hose from its inventory, cuts the hose to required length, and places a coupling on each end of the hose greatly shortening the delivery time (days) compared to a hose manufacturer (months). Bulk hose is available in varying lengths from a hose manufacturer, and the actual length will depend on the mandrel used by the manufacturer.

The resulting hose assemblies are called a SWAGED or CRIMPED HOSE, depending on the method used to "place" the end connector onto the hose, where the term "place" is being used to include swaging and/or crimping operations.

Crimping is exactly as it sounds—a fitting is crimped about the hose, much like a wire may be crimped in a connector. Swaging is different in that the item to be swaged is forced through a die that goes from a large diameter to smaller diameter. In both cases an outer metal part (called the ferrule) is compressed about an inner metal part (called the stem), with the hose between the two parts, to form the end connection. Simply stated, the ferrule binds the rubber hose and its reinforcing to the ferrule and stem, through compression of the ferrule.

Figure 4:
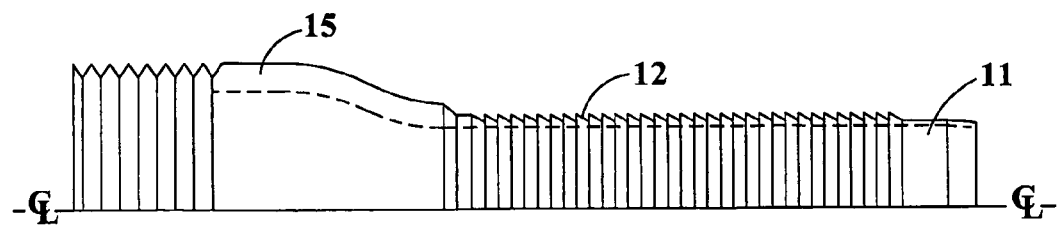
FIG. 4 is an engineering cross-sectional view of the current state of the art barbed stem with an NPT connection.
Figure 5:
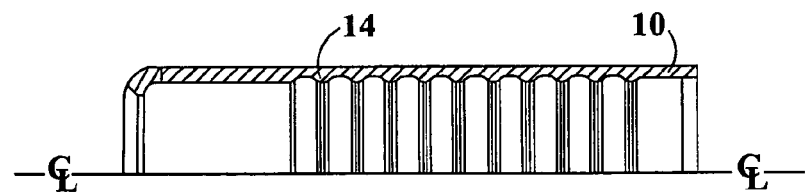
FIG. 5 is an engineering cross-sectional view of the current state of the art gripping ferrule.
Figure 6:
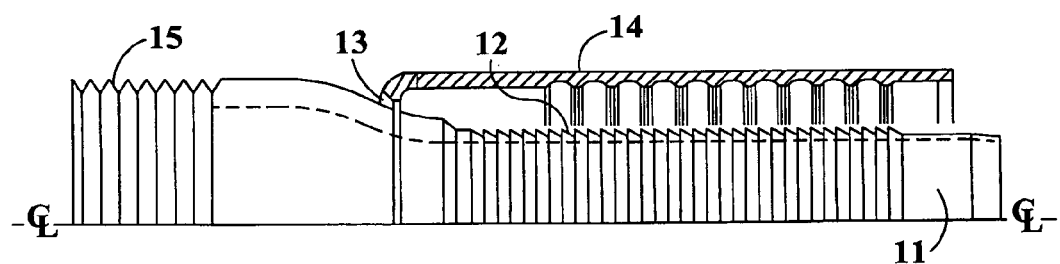
FIG. 6 is an engineering cross-sectional view of the current state of the art end connector with an NPT connection.
Figure 7A:
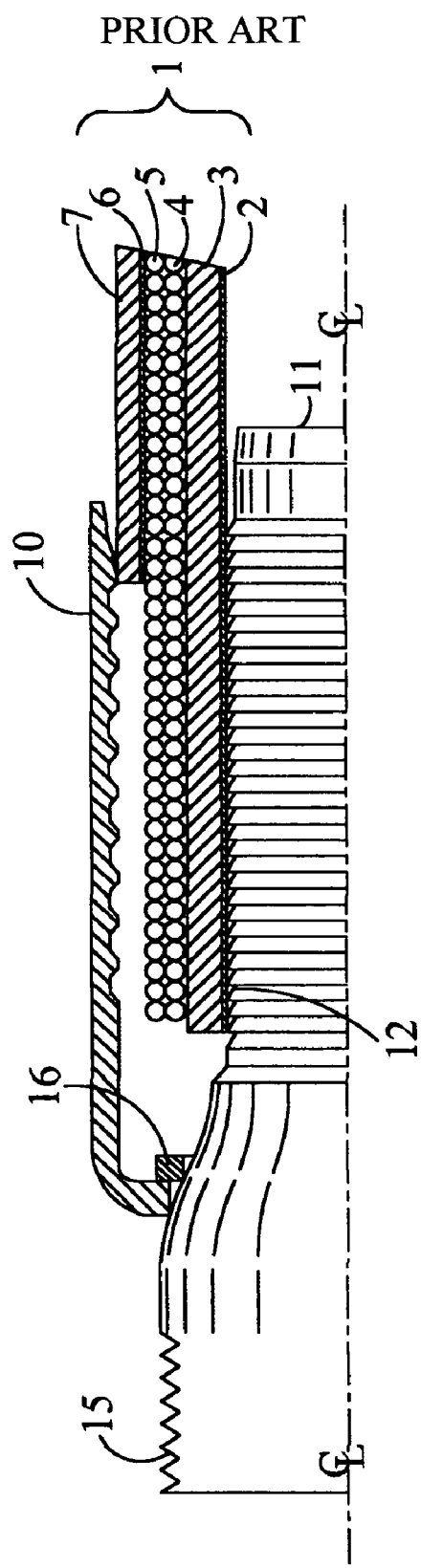
FIG. 7A is a cross-sectional view of a piece of rubber hose inserted into a state of the art swage coupling prior to swaging.

A typical stem, 11, terminated in a threaded end, 15, is shown in FIG. 4. FIG. 5 is the associated ferrule, 10, and FIG. 6 shows the ferrule welded 13 to the stem to form a completed "threaded" end connector. As shown in FIG. 7A, it is not necessary to weld the ferrule to the connector; however, a ring, 16, must be added to the stem, 11, for the ferrule, 10, to pull up against so the hose pump-off force is transferred to the final end connector through the ferrule. It should be understood that the pump-off force—the force that is caused by pressuring the hose—would tend to blow the hose off of the end connector. The pump-off force is transferred from the hose and hose reinforcement, through the ferrule, and onto (or into) the end connector.

Although techniques for crimping and/or swaging connectors on objects in general is well known, it must be realized that rubber hose will compress, deform and creep, whenever a metal object is compressed about the rubber. Creep is a process where the rubber flows (or oozes) due to the force of compression somewhat like plastic flow. Thus, one may place an end connector on the hose only to have the rubber deform (or creep) and have the end connector pull away from the hose at some later time. This could be disastrous.

Over the past sixty plus years fitting manufacturers have developed various techniques for placing and holding (aftermarket) fittings onto rubber hose. Initially, a two-part stem and ferrule were used. Referring now to FIGS. 4-6, the stem, 11, which had a series of barbs, 12, was inserted into the hose. A ferrule welded to the stem, 10, having a series of internal ridges, 14, (often called "lands" but for the purposes of this disclosure, when discussing the prior art, will be referred to as ridges) was compressed over the outside of the hose. (The ring construction of FIG. 7A could also be used to hold the ferrule in place.) It should be noted that these ridges had straight-sloped or vertical sides, which resulted in a relatively sharp edge between the sides and the top. The swaged ferrule drove the inner lining (tube) of the hose into the stem barbs while driving the cover and outer layer ($2^{nd}$ Carcass) into the ferrule lands and held the coupling in place. Thus, the connector was held in place by rubber and the associated reinforcement under compression. Under some circumstances and at high pressure, the coupling would still come loose from the hose.

The industry then went on to use a ferrule that had much deeper ridges intending that the deeper ridges would cut through the outer fabric and outer layer ($2^{nd}$ Carcass) and bite into and grip the outermost reinforcing ply. The concept was good; however, the ferrule ridges often nicked the reinforcement thereby inducing stress at the nick with corresponding failure of the reinforcement. It was also found that, in general, the prior art would not transmit enough tension to/from the reinforcement to be able to lockup the reinforcement to the ferrule within the end connector at high pressures.

The industry developed a technique called "skiving" to reduce the possibility that a coupling would be blown off of the hose under high pressure, and this technique found its first use with high-pressure hydraulic hose. Skiving reduced the depth of the ridges but resulted in more stress on the reinforcement because the compressed metal ferrule ridges interacted directly with the metal reinforcement of the hose. Essentially skiving involves removing the outer jacket (cover) and outer rubber layer (2nd Carcass) down to the reinforcement within the area of the hose occupied by the coupling as shown in FIG. 7A.

Figure 7B:
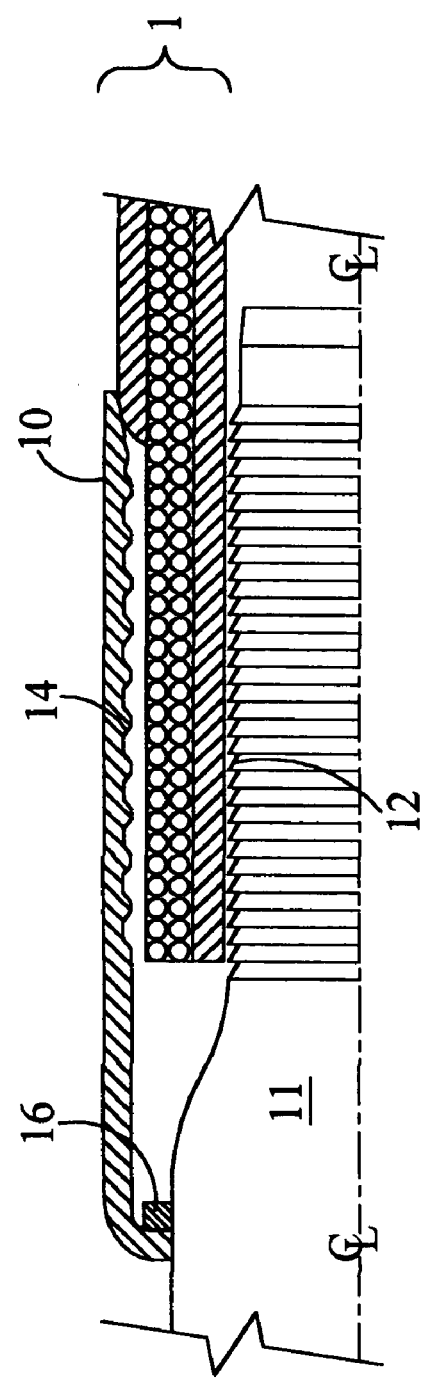
FIG. 7B is a conceptual view of FIG. 7A.
Figure 7C:
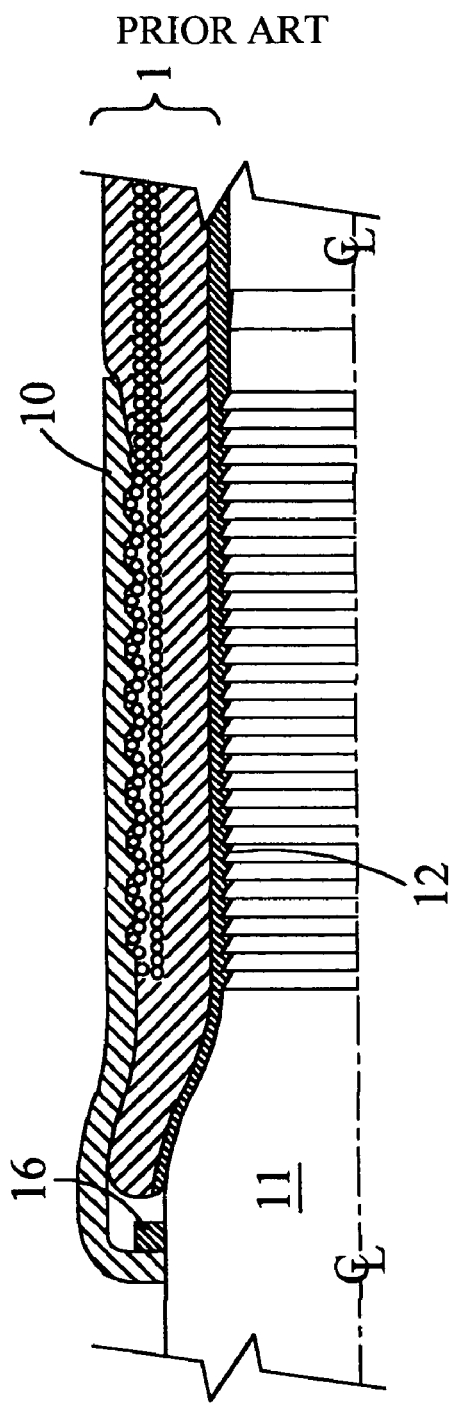
FIG. 7C is a conceptual view of FIG. 7A showing the action of the reinforced hose whenever the coupling is swaged. Note the growth of the rubber into the area provided at the connection end of the coupling and the distortion of the hose (due to growth) at the stem end of the coupling.

As shown conceptually in FIG. 7B, the skived hose is inserted into the coupling so that the stem (often with barbs, 12, although some smooth stems are used) fits tightly within the hose. The ferrule ridges, 14, adequately clear the exposed reinforcement. The open end of the ferrule, 10, is inserted past and over the outer cover of the hose, 1, so that the ferrule extends some distance over the cover to form a relatively continuous surface between the ferrule and the hose. The ferrule is then swaged or crimped (from the outside). As shown conceptually in FIG. 7C, the ferrule drives the inner lining and rubber into the stem barbs and at the same time clamps about the exposed wire reinforcement. Thus, the force (termed the pump-off-force) that tends to push the coupling loose from the hose is transferred from the reinforcement to the ferrule.

The technique of skiving was then expanded into the rotary hose coupling by the assignee of the present invention to reduce (or eliminate) the chance that an end connector would be driven or pulled off of rotary rubber hose. Unfortunately, skiving with the prior art connector does not work well with large diameter hoses (greater than 4 inches) and with 4-ply reinforcement (or greater). Essentially, the innermost layers of reinforcement shift under load and slide against the outer layers that are locked against the ferrule ridges. This is particularly true with cable reinforcement.

FIG. 5 shows a cross-section of a current art ferrule, 10, clearly showing the ridges, 14, within the ferrule that are designed to grip into the reinforcing cable or wire of the hose. The ridges have steeply sloped or vertical sides and a sharp corner at the tip of the ridge. The stem, 11, shown in FIG. 4, on the other hand, has a series of barbs, 12, that are formed to allow the hose to readily slip onto the stem while not allowing the hose to readily slip off.

Figure 8:
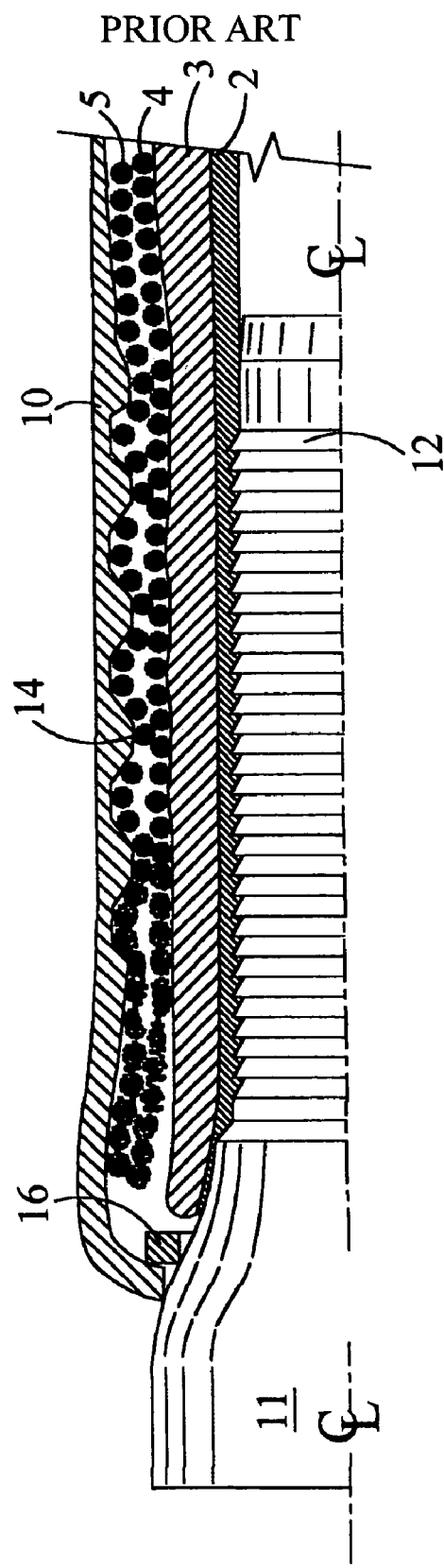
FIG. 8 is a cut-away view of a ferrule and stem of the current art.
Figure 9:
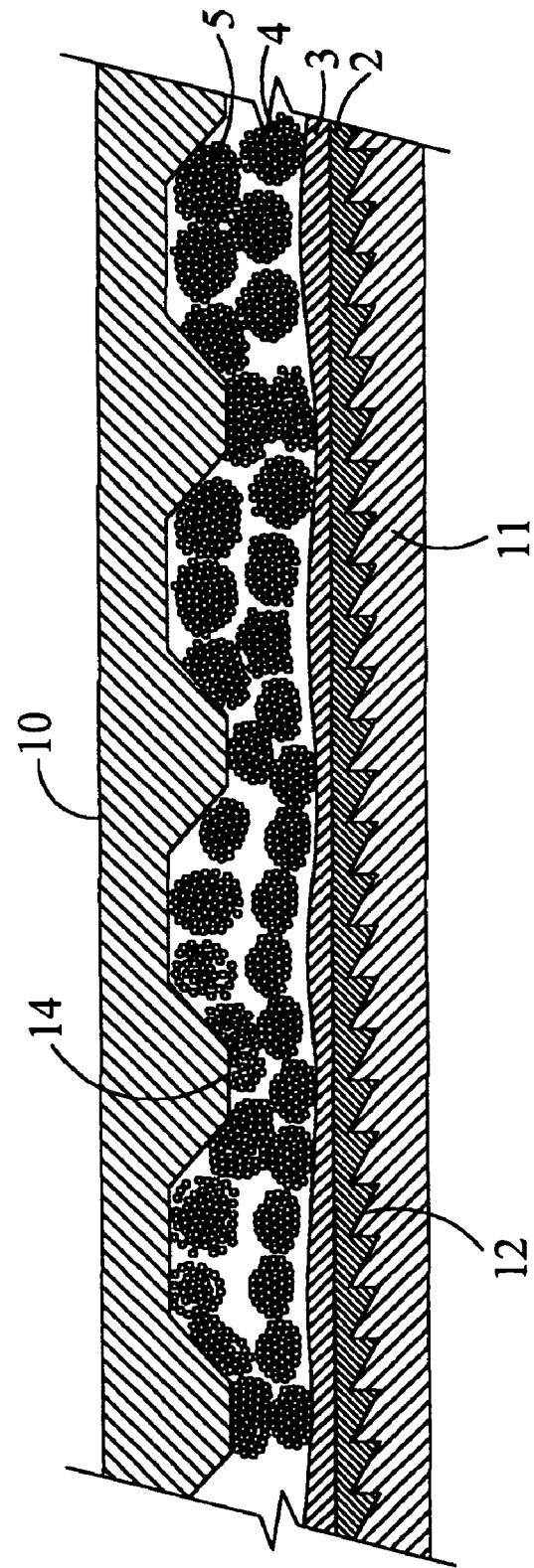
FIG. 9 is a close-up view of FIG. 8. Note the barbs gripping into the tube and $1^{st}$ carcass as well as the intermeshing of the ridges of the ferrule with the wire reinforcement.

FIGS. 8 and 9 illustrate the gripping action between the ferrule, 10, and the reinforcing cable, 4 and 5, and between the tube/first carcass, 2 and 3, and the barbs, 12, in the current art. The figures clearly illustrate that the barbs pull into the hose and lightly penetrate the hose forming a liquid tight seal. Further the figures illustrate the distortion of the cable that occurs within the ridges of the ferrule. Not illustrated in the figure, but revealed in failure analysis is the fact that the ridges in the ferrule can damage the high tensile wire cables. The damage takes the form of stress points that weaken the cable and can result in a failure of the hose. The greatest damage takes place within the connector running from the inboard end (hose end of the connector) roughly one-third of the way towards the outboard end where the greatest ferrule axial displacement occurs during the swaging operation. The hose bursts at the weakened reinforcement point(s), and this generally happens at or near the inboard end of the hose connector. When the hose burst it often rips the reinforcement out of the fitting.

The reader should examine the left-hand side of FIG. 8, the end nearest the fitting end (outboard end) of the connector (opposite the hose end) carefully. The figure illustrates how the inner carcass, 3, and tube, 2, lie against the stem, 11, but show that the cable reinforcement, 4 and 5, pulls away from the rubber hose inside the closed end of the ferrule. This action occurs throughout the end connector to some extent and reduces the overall strength of the connection simply because the rubber bond to the multiple ply reinforcement is destroyed, in the current art, by the swaging operation.

The inventors, all of whom are employees of the assignee, realized that some technique or device was needed that would reduce the stress points on the reinforcement and interact more closely with the reinforcement thereby holding it in tension inside the fitting. Furthermore they realized, based on research conducted with their own prior art that the ridges (lands) of the ferrule in reality only interacted completely with the outer ply of two-ply cable reinforcement. This meant that little lock was obtained with the inner ply to the ferrule, except that caused by compression acting alone, and caused them to believe that an end connector for 4-ply cable reinforced hose would not be stronger than the hose itself—an object of the invention.

Figure 10:
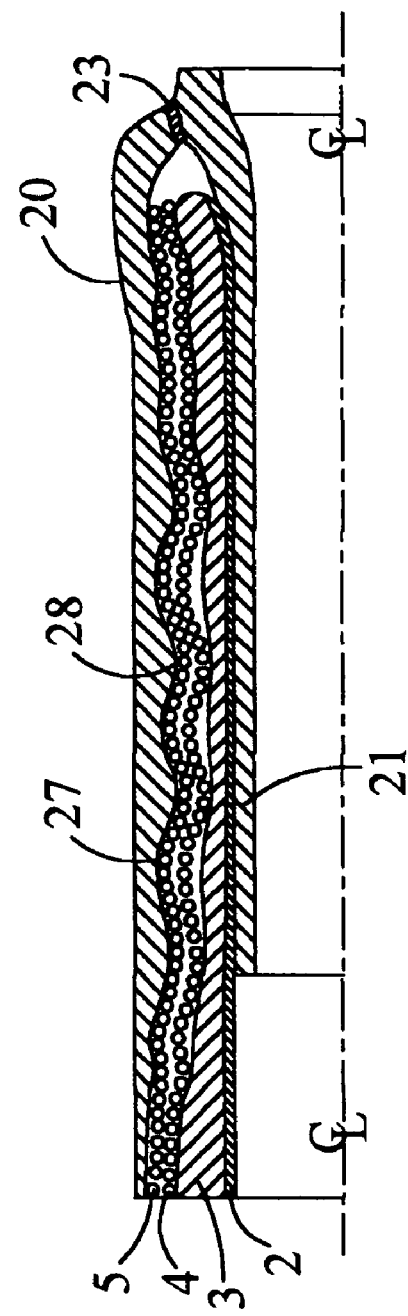
FIG. 10 is a cut-a-way view of one of the early prototypes of the instant device. Note the wave action between the ferrule and the two-ply reinforcing wire; however, this particular developmental stem does not have the waved rises of the stem of FIG. 11.

The inventors realized that a technique was needed to cause the reinforcement to migrate into some sort of lock without denting, nicking or over stressing the reinforcement and that the lock should apply to all reinforcement plys including the innermost cable closest to the stem. They then employed a trial and error technique that resulted in a sine/cosine wave-like (sinusoidal) series of lands, 28, and nodes, 27, within the initial ferrule, 20 as shown in FIG. 10. The first series of prototypes used a smooth stem, 21, because the inventors initially believed that the interaction was only needed in the ferrule and that the tube needed to see a smooth surface. The resulting wave action between the BOTH plys of the reinforcing cable is illustrated in FIG. 10. (Compare this wave action on both plys to the distorted action in FIGS. 8 and 9 in the prior art.) FIG. 10 illustrates the substantial reduction in distortion of the hose (tearing the reinforcement away from the rubber) that was obtained with the initial experiments.

The first series of prototypes yielded good results in that they were an improvement over the present art, but hoses still burst under pressure testing near or slightly inside the inboard end of the end connector. Destructive testing still showed that the desired lock and sine like wave (sinusoidal) needed to hold the reinforcement in tension were not being fully developed.

Figure 11:
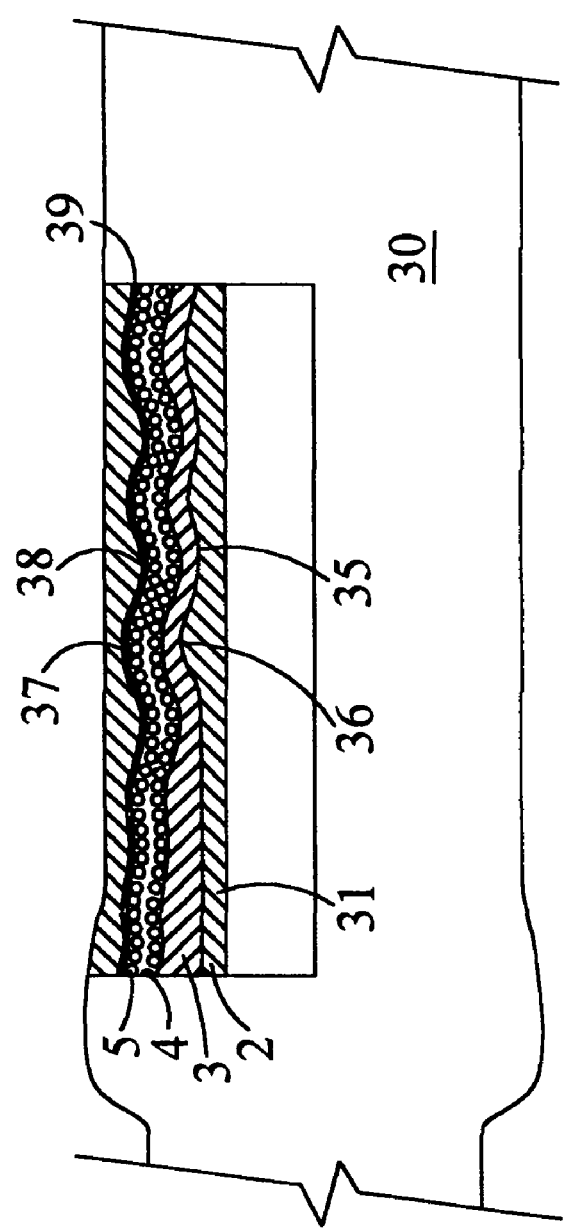
FIG. 11 is another cut-a-way view of a more recent prototype of the instant device identifying the various components note the wave action between the reinforcing wire and lands of the ferrule and the rises of the stem.
Figure 12:
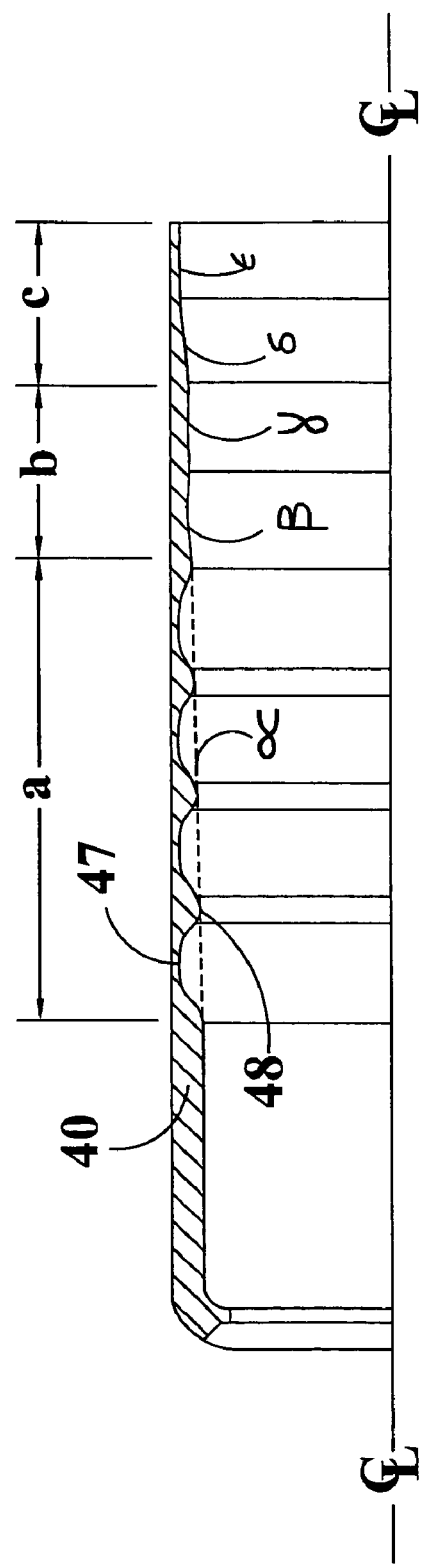
FIG. 12 is a cross-sectional view of the ferrule of the instant device.
Figure 13:
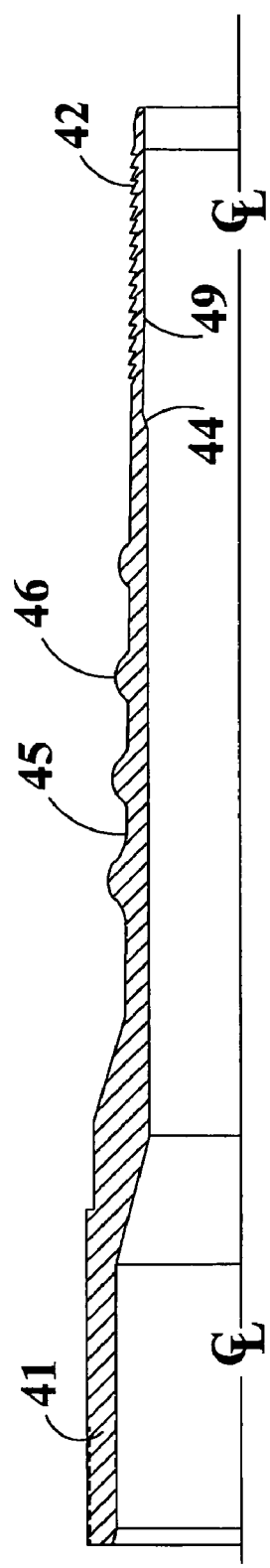
FIG. 13 is a cross-sectional view of the stem of the instant device.

An intermediate prototype device, shown as a cut-away in FIG. 11, evolved and was designed to work with 2-ply cable 3½ inch ID hose. The intermediate prototype consisted of a sine-wave series of lands, 38, and nodes, 37, within the ferrule, 30, and a corresponding series of sine-wave flutes, 36, and grooves, 35, on the stem, 31. The end region of the stem (the first few inches furthest inside the hose) still used barbs in order to ensure a liquid tight seal against the inner tube (not shown). To aid in distinguishing the instant invention from the prior art the terms "lands" and "nodes" will be used when discussing the ferrule and "flutes" (which is considered a synonym for lands) and "grooves" (which is considered a synonym for nodes) will be used when discussing the stem. The terms "high points" and "low points" will be used to collectively and sequentially to refer to the lands, flutes, nodes and grooves.

FIGS. 12-16, which show the preferred embodiment of the instant invention, may be used to further describe (show) the intermediate design. The preferred embodiment is similar to the intermediate prototype device except that intermediate prototype did NOT have the step, 49, in the stem, which was added to the final test device as will be explained.

This intermediate 2-ply cable prototype device satisfied the need to reduce stress in the hose reinforcement and caused the sought after "wave-action" in the 2 plys of the reinforcing cable. As illustrated in the Figures the stem, 31 or 41, has "waved" high points or flutes, 36 or 46 and "waved" low points or grooves, 35 or 45. The ferrule has "waved" high points or lands, 38 or 48 and "waved" low points or nodes, 37 or 47. (The 30-series of numbers apply to the intermediate prototype without the step, 49, in the stem, and the 40-series of drawings apply to the preferred embodiment with the step, 49 in the stem.)

The ferrule may include a tapering slope that starts at the first groove, from the fitting end, and extends towards the hose end. This slope is further increased at the end next to the hose (opposite the coupling or fitting end of the coupling) where extension of both the ferrule and hose will occur during the swaging operation.

The ferrule slope is part of the "manipulation" of the hose and its reinforcement during the process of connecting the instant device to the hose. The slope, $\alpha$, in the first section starts at first land and extends past the last land by several inches. The slope is between 40 and 10 hundredths of an inch defined as a difference between the ID measured at the first land and compared to the ID measured at the last land. Essentially, as one looks along the high points of the ferrule, the high points are lower as one moves towards the hose end of the end connector. A similar statement may be made about the high points of the stem with the slope being between 40 and 10 hundredths of an inch. The slope then changes by about 4-degrees (shown as $\beta$) in the second section, b, becoming a flat profile, $\gamma$. The profile changes again by about 8-degrees (shown as $\delta$) and terminates in a final flat profile at $\epsilon$ in the final section c. The lengths of sections a, b, and c vary, as do the values of $\alpha$ through $\epsilon$, and all must be determined by trial and error based on the manufacturer's hose, diameter, etc.

Figure 16:
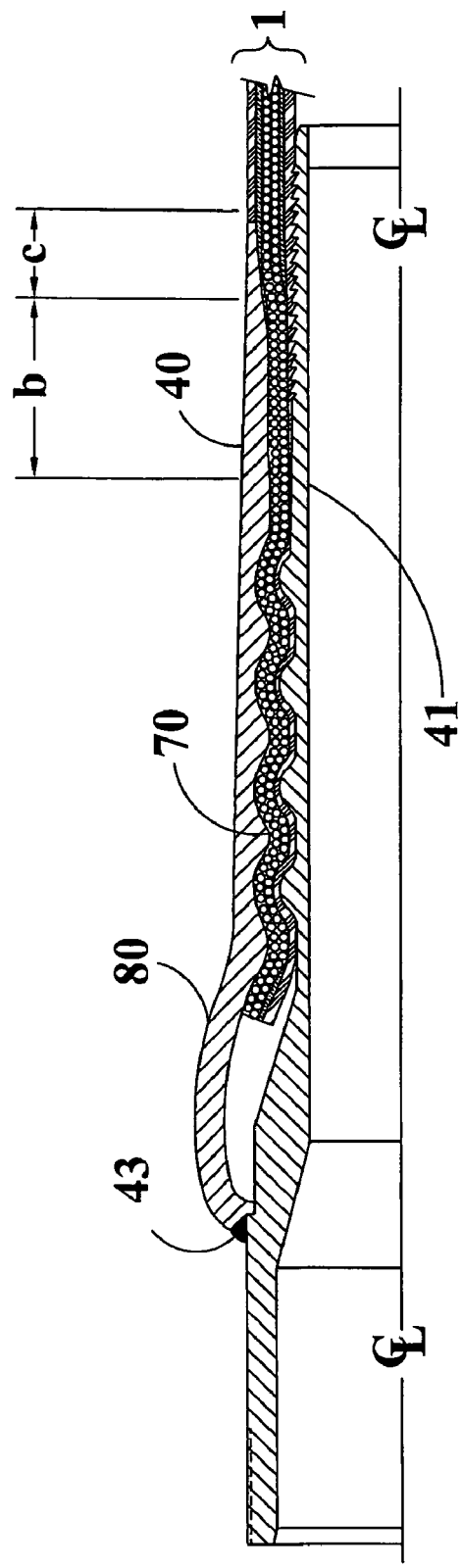
FIG. 16 is a conceptual cross-sectional view showing the action of the reinforced hose whenever the coupling is swaged. Note the growth of the rubber into the area provided at the connection end of the coupling.

As shown in FIG. 16, the second and third sections, b and c, align over the barbed portion of the stem after the connecting (expansion/swaging) operation is complete. The sectioned slope spreads the swaging force over the reinforced hose in an even manner assuring that separation of the plys from the rubber is minimized (or even eliminated) and reduces the overall stress on the hose and its reinforcement. It should be noted that the sinusoidal wave-like concept works without the ferrule land slope and the stem flute slope; however, these slopes are preferred because the overall stress is reduced.

Figure 14:
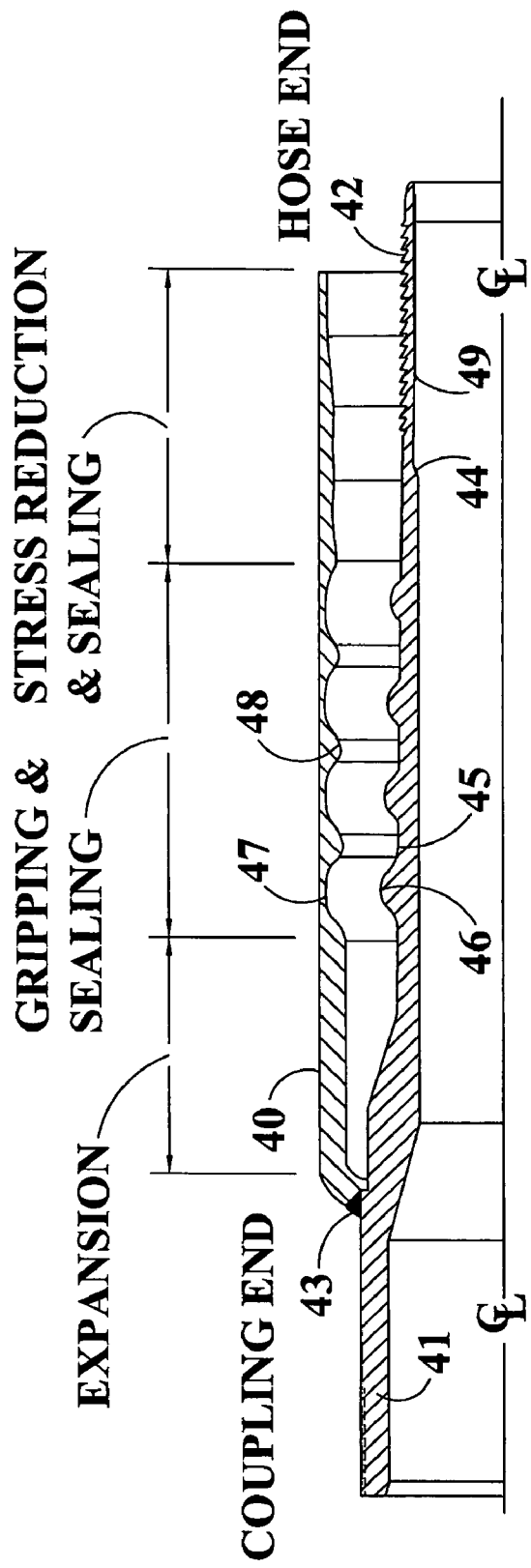
FIG. 14 is an engineering cross-sectional view of the instant device, before swaging, showing the waved ferrule and waved stem. Note the lands and high points do not lie opposite each other.

Close examination of FIG. 14 will show that the ferrule high and low points and stem high and low points do NOT line up in the device prior to expanding and swaging. The first node and flute more or less align, while the other pairs of high and low points show an offset to each other. This is deliberate. The object is for the high and low points to align after the mechanical attachment operation is complete due to relative axial displacement between the stem and ferrule when the overall fitting is mechanically driven into its final dimension.

The operation of connecting the device onto a reinforced rubber hose is somewhat more complex that in the prior art. Essentially the connector is attached to a press, and a draw bar is inserted into the stem. A plug (die or mandrel) is attached to the bar and the hose is then inserted into the stem/ferrule. This sets up the preferred two-step operation. The stem is first preferably expanded internally into the hose by retracting on the draw bar. Secondly, the ferrule is swaged onto the hose/stem combination. This will be explained further.

Careful engineering is required to dimension the materials such that, when the materials forming the stem and ferrule are respectively first expanded (and shorten) and then swaged (and elongate) the respective high and low points come into alignment. This "coming into alignment" is another key to the device. The axial displacement of the stem and then the axial displacement of the ferrule cause the reinforcement to move and follow the shape of the matching waved high and low points thereby forming a sinusoidal lock. Careful engineering and material choice is also required to minimize the relative axial motion between the stem and the ferrule.

The design for minimum relative axial movement is such that it causes minimum stress between the rubber first carcass, which is bound to the reinforcement. This is critical, for if the relative movement between the carcass and the reinforcement is too great the rubber separates from the reinforcing cable. The height of the flutes (stem high points or bumps) must be carefully chosen so that, when the stem is expanded, the flutes will not press too far into the hose ID which would cause stress in the reinforcement and separation of the rubber.

Figure 15:
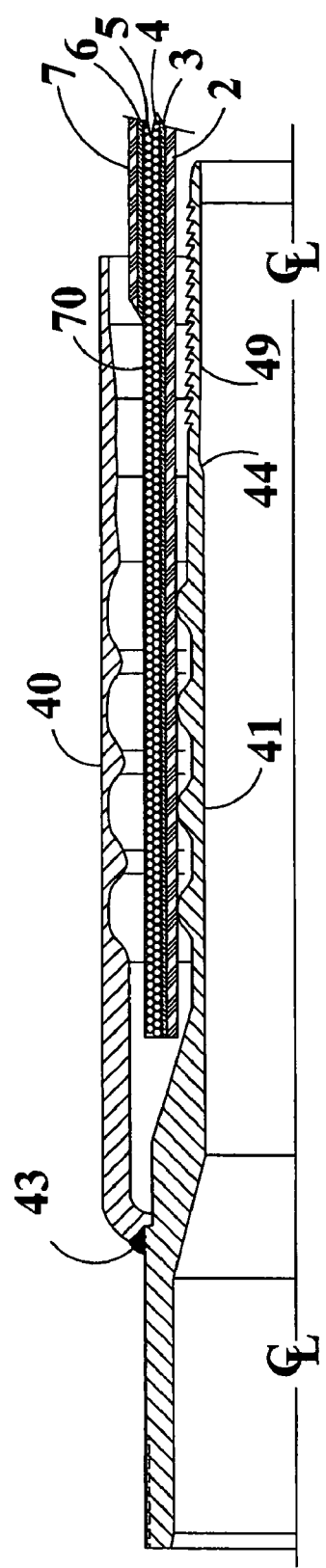
FIG. 15 is a conceptual cross-sectional view of a piece of rubber hose inserted into the swage coupling prior to swaging.

Skiving is employed in the 4-ply E fitting (design capacity 24,000 psi) although it is known that skiving is not necessary for C and D fittings (to be discussed later). Referring to FIG. 15, the skived hose, 1, is placed over the stem, 41, with an optional copper sleeve, 70, as shown in FIG. 15. The optional copper sleeve reduces abrasion between the lands on the ferrule and the cable ply: the copper basically acts as a lubricant. The sleeve is not required—just recommended based on experimentation and good practice. In fact, the cooper sleeve was not used in the test 4-ply E fitting that will be described later.

As already stated a preferable two-step connection process is employed. First the stem is expanded by drawing a die, or mandrel, back through the stem from the hose. (This of course requires that the stem die or mandrel and a draw bar be in place before the stem is placed over the draw bar and then in the hose.) The expansion of the stem causes the stem to reduce in length and the associated non-linear reduction in length must be carefully anticipated. The choice of metal, the diameter of the stem, and the thickness of the stem at the different stem cross-sections all control the axial displacement (shortening) of the stem during the expansion operation. This will be explained in further detail.

Finally the outside swaging operation (on the ferrule) follows. The outside swaging operation may take more than one step. (I.e., due to equipment limitations it may be necessary to swage to one particular diameter and then swage to a final smaller diameter.) Because the ferrule is being radially compressed, it will axially and non-linearly elongate. Again, the choice of metal, the initial ID diameter of the ferrule, and the thickness of the ferrule all control the displacement (elongation) of the ferrule during the swaging operation. This will be explained in further detail.

The result of the expansion and swaging operation is shown in FIG. 16 (and in cut-a-way illustration FIG. 11). Note how the rubber hose expands into the space, 80, in the ferrule at the coupling end and how the stem and ferrule respectfully shorten and elongate so that the high and low points align. The space 80, is the partial result of the swaging operation and the shape of the ferrule before swaging. A small part of that space is caused because the ferrule expands as it is compressed towards the fitting end after it locks to stem and hose at about its middle during swaging. (In a test device the ferrule moved some ½-inch, of that movement about $^{13}/_{32}$-inch moved towards the hose and about $^{3}/_{32}$-inch moved towards the fitting end.) The space is designed to accept the rubber as it is displaced during the swaging operation. At the hose end (opposite the coupling) note how the hose shows minimum distortion because the displacement of the connector has been minimized by careful choice of the critical parameters, tensile strength of the metal, minimizing the radial thickness of the ferrule and stem, minimizing the required expansion and compression and minimizing the stand off distance between the ferrule and the stem.

The intermediate prototype described above was exactly that—a prototype. In machining the intermediate prototype standard pipe steel with a yield strength of about 45 Kpsi was used. Furthermore a rather large standoff was used for the ferrule. Standoff is used to describe the un-attached clearance between the ferrule and reinforcement. The current art uses fairly large values of standoff so that a given end connector may be used on a number of different hoses manufactured by various hose manufacturers whose dimensions vary. It should be noted that each manufacturer has different dimensions for its hose (except for the internal diameter) and good warehouse practice requires a minimum number of fittings, thus large standoffs are employed.

Because, the initial prototypes were manufactured from relatively mild steels the inventors initially used the well known engineering practice "thicker must be stronger" to assure that the goal of producing a fitting that was stronger than the hose would be realized. This was a mistake as will be explained. The reason for using thick materials in the end connectors is fairly simple and revolves about the "pump-off" force. As stated earlier, this is the force that attempts to pull the hose away from the fitting when the hose is subjected to pressure. This force must be transferred from the hose to the end connector and onto the fitting in which the end connector terminates.

A designer, in setting design criteria, must also consider the stem hoop strength and ferrule spring back that occurs after swaging. The designer must also consider the rupture pressure at the extreme threaded end of the fitting, the tension carrying capacity of the ferrule and its attachment point to the stem (weld or ring) and the tension carrying capacity of the stem near the threads (fitting). A person skilled in fitting design and metallurgy would have no trouble in designing to meet criteria: it is the purpose of this disclosure to alert the reader to these criteria.

It should also be noted that the sine wave like lock between the instant device and the hose (here the term hose includes all parts of the hose—reinforcement, carcass, liner, etc.) will cause some of the pump-off load to be transferred to the stem. The past art may have transferred some of this load but the load to the stem would be minuscule because the prior art stem only bound itself to the rubber inner liner. This liner had little strength and would readily creep under load. The instant device, because of the sine-wave lock between the reinforcement and the connector (both stem and ferrule) will transfer some of the anticipated axial load to the stem through the compressed rubber of the hose. The actual value of transferred load would have to be measured using strain gauges or the like, simply because the properties of rubber are so unpredictable (and vary from manufacturer to manufacturer).

The maximum design pump-off force can readily be calculated. For example assume a 24 Kpsi burst pressure hose. The maximum pump-off force can be calculated by using the inside cross-sectional area of the hose times the anticipated burst pressure. In reality, the actual maximum pump-off force is based on the cross-sectional area of the end fitting that is exposed to the fluid pressure—always less than the outside diameter of the hose. (The design pump-off force would be the maximum force plus a safety factor.) Using the approximation, let us assume a 4-inch hose at 24 Kpsi burst pressure this yields a pump-off force of about 301,600 pounds$_{force}$. (In reality in the 4-ply E fitting the internal diameter was 3.919 inches and the pump-off force would be roughly 289,500 pounds$_{force}$.) Standard engineering practice would dictate, "over-design it: make it thick!"

Figures 17A, 17B:
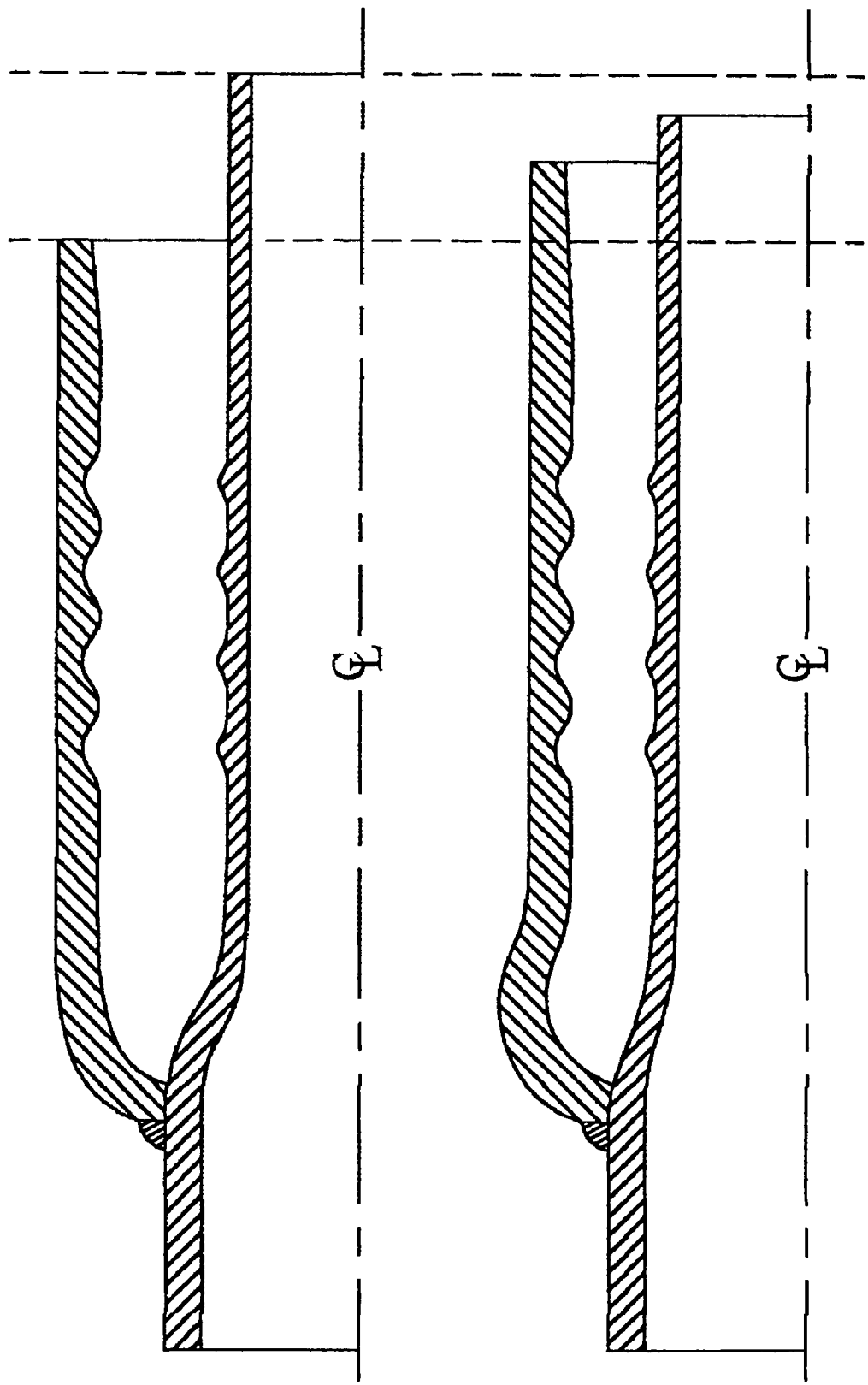
FIG. 17A is a conceptual cross-sectional view of a thick wall coupling prior to internal expansion and external crimping or swaging.
FIG. 17B is a conceptual cross-sectional view of a thick wall coupling after internal expansion and external crimping or swaging showing the movement of the metal parts due to the expansion/compression operation.

FIGS. 17A and 17B illustrate the result of the over-design decision ("thicker must be stronger"). FIG. 17A shows a ferrule/stem prior to expansion/swaging. FIG. 17B shows the same connector after expanding the stem and swaging the ferrule. The relative axial displacement is about 13 units. The stem shortens by 3 units and the ferrule elongates by 10 units. This can impose severe stress on the hose that results in ripping the reinforcement away from the rubber, severe bending, tension and compression stress on the reinforcement and other possible damage to the reinforcement. Most of stress is concentrated in the inboard one-third of the end connector.

Figures 18A, 18B:
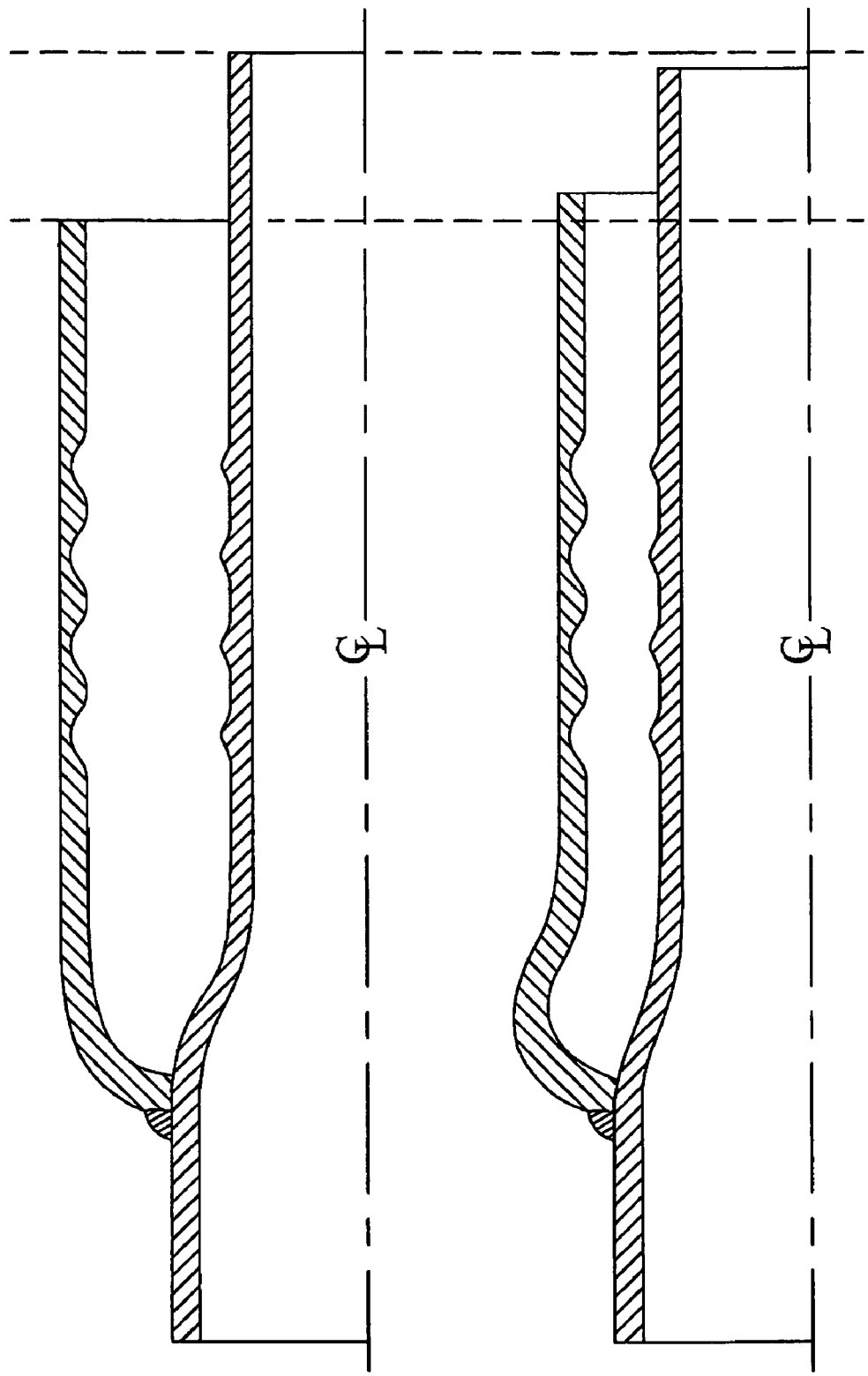
FIG. 18A is a conceptual cross-sectional view of a thin wall coupling prior to internal expansion and external crimping or swaging.
FIG. 18B is a conceptual cross-sectional view of a thin wall coupling after internal expansion and external crimping or swaging showing the movement of the metal parts due to the expansion/compression operation.

FIGS. 18A and 18B illustrate the same result when thinner and much higher tensile strength materials, designed to meet the same safety design factors as used in the examples of FIGS. 17A and 17B. The relative axial displacement is 8 units after expanding the stem and swaging the ferrule. The stem shortens by 2 units and the ferrule elongates by 6 units thereby reducing the movement that causes reinforcement strain by approximately {(13–8))/13} or 38.5%.

The inventors constructed a number of prototype 4-ply 3½ and 4-inch ID hose devices using the techniques discussed above until the final design emerged. All of the these prototypes, once the plug was pulled through the stem had a "banana" shape, or the stem ruptured or the stem ruptured and had a banana shape. Finally, a device was manufactured and internally expanded onto a hose, with no external swaging. When the device was cut open, the banana shape was again discovered occupying the end of the stem furthest inside the hose. It was decided that the preferred internal expansion was the probable cause of the banana shape and/or rupture and resulted from moving too much material when the plug was pulled through the stem. The ruptures had to be caused by radial expansion. (I.e., too much material had to be moved radially to expand the stem to its required size.) The banana shape had to be caused by the fact that the stem was too long, basically the classic column buckling problem.

Referring back to FIGS. 13-15, the inventors then reduced the size of the flutes, 46, and added a step, 49, to the inside of the stem, 41, that took up several inches in axial length at the hose end. The expansion plug still expanded the stem in the region of the step but by lesser amount, and the step ends in a transition, 44, that allows the expansion plug to continue on through the stem. The reduction in flute size meant that less radial material would have to be moved during expansion of the stem. The addition of the step meant that the overall axial stem length subject to expansion was reduced by the axial length of the step during expansion; thereby solving the column buckling problem. At the same time the thickness of the ferrule was reduced at the end nearest the hose (the second and third sections, b and c, described earlier) mainly to reduce the radial compression force exerted on the stem. See FIGS. 14-16. These measures, although flying in the face of the current state of the art actually improved the device.

Figure 20:
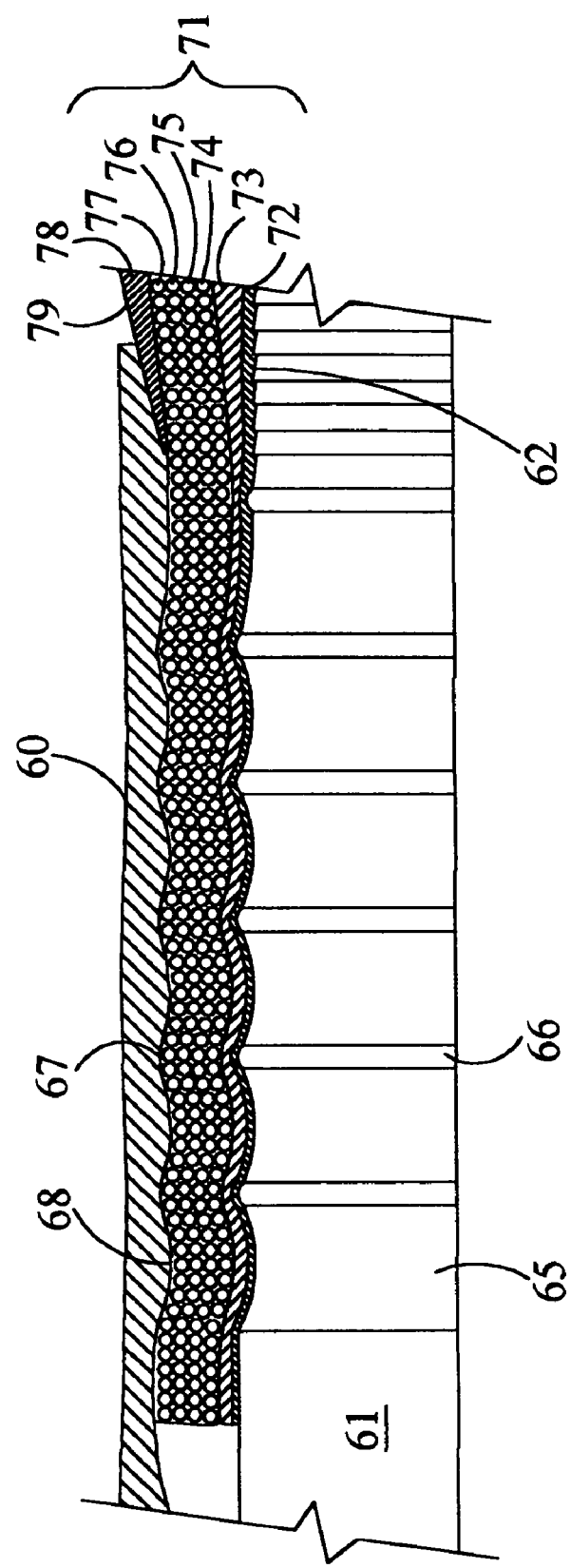
FIG. 20 is a cut-away illustration of a E grade hose connector after undertaking the 20,100 psi burst test. Note the sinusoidal shape of the 4 plys.

On the next test the banana shape did not appear nor did the stem rupture. Referring to FIG. 20, it was noted that the tube, 72, of the hose (at the point where it seals to the stem in the area furthest inside the hose was not distorted, crushed or ripped and that the second carcass, 78, and outer cover, 79, made a smooth transition from within the ferrule to the hose next to the end connector. In their testing, the inventors again confirmed that the values of the thickness of material, lengths, etc (i.e. dimensions) must be determined empirically. It was also found that values were set by the type of hose (manufacturer), diameter, number of plys, etc. The step, 49, is about 0.2 radial-inches when used in 4-inch ID end connector stem and expands by roughly 50-thousandths when the mandrel is drawn through the stem. (The actual values of expansion would lie in a range between 1-thousandth and 200 thousandths of an inch and could made greater if the overall length of the stem is reduced.) The step value would be less in a smaller diameter end connector. The step has an 8-degree tapered transition, 44, back the to the normal ID of the stem (although this value should not limit the disclosure) and is about 4-inches in axial length, which places the transition, 44, at a point lying about one-third into the stem from the hose end. The length could be greater—at least up to the mid point (half-way).

In their series of experiments the inventors have demonstrated that high strength materials will elongate or shorten much less than mild (low strength) materials when they are drawn over or extruded through dies. Thus, in designing the instant device, the design uses high tensile strength materials (greater than 85 Kpsi), sets a critical (minimal) cross-section that is as thin as practically possible and minimizes the standoff between the outer reinforcing ply surface and the ferrule ID. The prototypes and test pieces use a 2:1 safety factor.

There are further considerations in setting the thickness of the stem and ferrule. The actual pump-off force is transferred from the hose through the reinforcement to the ferrule and onto the connector end of the stem. Thus the ferrule should have as its minimum thickness (the thinnest cross-section in the ferrule) a thickness designed to carry the tensile load pump-off force plus a safety factor.

On the other hand, the stem must be made thick enough that when the rubber hose and reinforcement are swaged against it—it will not buckle. This will be set by the "hoop" strength of the critical cross-section (thinness) of the stem. Similarly, because the stem now picks up some of load, some consideration must be given to the stem's tensile carrying capacity. Although some true engineering design can take place, much of the design is empirical because rubber has inconsistent and unpredictable qualities. The designer must also realize that once rubber is under compression it creeps for a long period of time. In fact, much of the design will depend on the type and manufacturer of the actual hose that is being used. Further, rubber varies from batch to batch—different vulcanizations from identical rubber formulations and mixing equipment will have different properties. Thus, in order to manufacture a line of fittings destructive analysis of each size of fitting is required before it may be made available for a particular manufacturer's hose and allowance must be made for different vulcanizations with significant design safety factors.

In addition, the stem should be sized to fit tightly inside the hose while the ferrule should fit tightly about the reinforcement (if skiving is employed) and the copper sheet (if a copper sheet is employed) or about the outer cover if skiving is not employed. Simply stated, an end connector sized for a given hose manufacturer is required. This flies in the face of the current art, which attempts to fit numerous hoses with one size of fitting. Remember that the greater the ferrule over sizing—to meet multiple manufacture's hose with one fitting—the greater the actual axial expansion of the ferrule during swaging (for ferrules of same average cross-sectional thickness).

Thus, the preferred embodiment of the present invention accomplishes its purpose by using a sinusoidal shaped land and node structure formed within the ferrule and a corresponding sinusoidal shaped flute and groove structure formed on the stem that, after the stem is first expanded into the hose and after the ferrule is swaged down into the hose, locks the reinforcement plys into a sinusoidal wave pattern while minimizing the overall relative axial displacement of the stem and ferrule during the two part installation operation. The axial displacement is minimized by using high tensile strength material for both the stem and the ferrule, by carefully setting the radial critical (minimal) thickness of the stem and ferrule, and by minimizing the ferrule standoff. The internal expansion of the stem high points (flutes) into the hose ID assures that the cable plys fall into the sinusoidal wave-like pattern when it is locked by the swaging operation on the ferrule. These actions transfer the hose reinforcing tensile strength to the ferrule, and to some extent the stem, via the compressed sinusoidal wave reinforcement configuration.

It has been made clear that the preferred embodiment uses a two-step operation for attaching the end connector to the reinforced rubber hose. The first step involves internally expanding the stem so that the low points (grooves) move up against the hose ID. This step may be omitted.

It is interesting to compare the present art with the instant device. The instant device will allow for more, unrestricted, flow over the present art because the stem is expanded into the hose. Further high tensile strength metal is used in manufacturing the stem this results in less material in the stem. These two features mean that the stem offers less restriction to fluid flow through the hose when compared to the present art.

Figure 19:
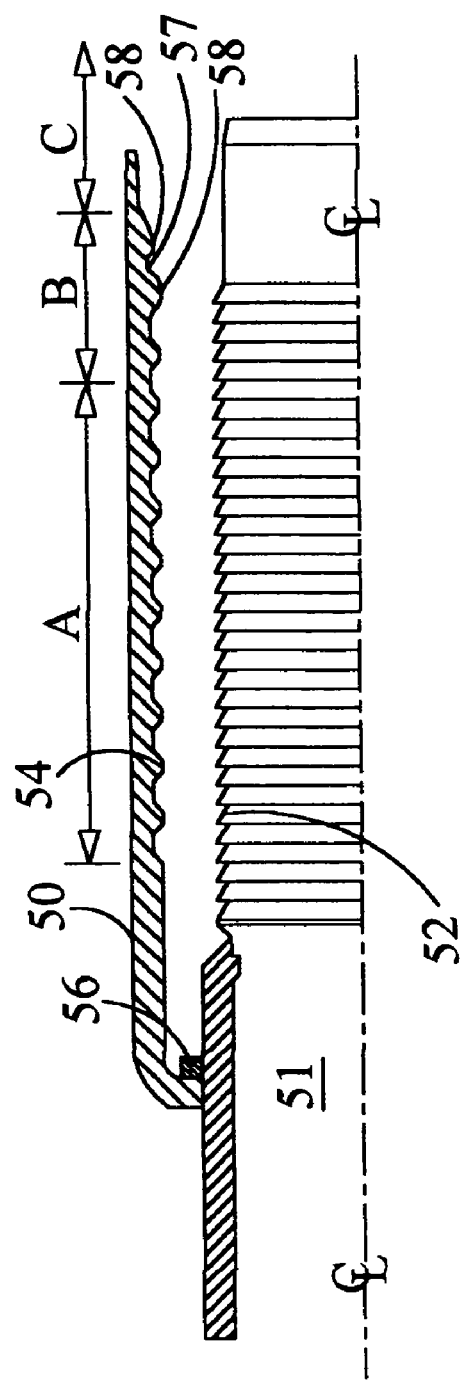
FIG. 19 is an engineering cross-sectional view of an alternate embodiment of the instant device, before swaging, showing a modified ferrule of the current art with the waved section at the hose end interacting with a modified serrated stem of the current art having a smooth portion in proximity with the waved portion of the ferrule.

There are other embodiments involving the waved ferrule and stem. For example, a series of waved-lands may be employed at the inboard (hose) end of the connector, where the greatest relative axial displacement—during attachment—occurs. The remaining portion of the stem and ferrule may use the old art (i.e., ridges and barbs) as shown in FIG. 19. It is known that a combination of a plain stem and waved ferrule may be employed. In fact the old art barbed stem may be used with a combination waved-sloped ferrule. The combinations are endless and fall within the concept of this disclosure. These combination devices will not produce the same tight interlocked wave pattern that the preferred device and method of attachment produces. However, the use of the sinusoidal concept is certainly an improvement to the prior art and reduces stress in the reinforcement at the most critical point.

In improving the prior art end connector (see FIG. 19), the prior art ridges, 54, are replaced at the open end of the ferrule for between 50 and 15 percent of the length taken up by the standard ridges within the ferrule by a series of sinusoidal like lands and nodes, 58 and 57. (Section A shows the remaining ridges—prior art, section B shows the new art and section C shows the tampering section—same as "c" of FIG. 12.) The hose may be skived in the area that the standard ridges, 54 and sinusoidal lands, 58, and nodes, 57, would contact hose. This means that stress would be induced in the reinforcement under the standard lands, but that the sinusoidal concept would reduce the stress—in the section of the hose that truly matters—that is the section where the hose enters the end connector. (See the earlier discussion on prior art.) An optional copper sleeve (not shown) can reduce the stress even more. This improvement can readily be applied to reinforced hose having 2 plys and rated at less than 12,000 psi burst pressure with a diameter not to exceed 4 inches, which is the current state of the art. The 4-inch diameter should not be viewed as a limitation on the device, it is simply the largest size of hose currently available at the given burst pressure and skiving is not always necessary.

At the outset, the inventors believed that their preferred device would have a force carrying capacity greater than the pressure carrying capacity of the hose itself because of the sinusoidal means for gripping the hose. To prove this belief, several pressure burst tests to failure were conducted on the preferred device as disclosed above and the alternate embodiment using a ferrule with the wave pattern and a prior art stem. These tests to failure were successful and when the end connector was cut open revealed that the wave pattern was indeed obtained with two ply hose using the both the preferred embodiment and the alternate embodiment.

The most impressive test was conducted on four ply cable reinforced grade E rubber hose using the preferred 4-ply 4-inch end connector. An illustration of the cut-away cross-section of the test connector is shown in FIG. 20 where the 4-inch API Grade E hose burst at 20,100 psi. The reader should note how ALL four plys have assumed the sinusoidal shape thereby locking each ply into the ferrule.

In the API Grade E connector test, a preferred end connector was attached to each end of a fourteen foot length of Gates Grade E Rotary Hose (Serial # 2RT-206) having an internal diameter of 4-inches and an external cover diameter of 6.44-inches. The manufacturer's rating on the hose was:
Working Pressure—7,500 psi Test Pressure—15,000 psi Minimum Burst Pressure—18,750 psi
The manufacturer's data on the end connector was:
Stem Part Number—4" E Mod.2 Swage—yes
Ferrule Number—4" E Mod.2 Internal Expansion—3.57" OD Plug
Stem Dim.—4.07 Mean Dia. Die Size—1st) 7.38" 2nd) 6.79"
Ferrule Dim.—7.75" OD×6.50 ID Measured Swage OD—6.82"/6.82"
Compression %—Design: 22.8%/22.8% Actual: 22.3%/22.3%
The test results were astonishing:
Actual Burst Pressure—20,100 psi Time Held@Burst Pressure—N/A
This test was the first test conducted on a Grade E Connector manufactured as disclosed in this disclosure and attached to BOTH ends of 4-inch ID API Grade E hose having a minimum burst pressure of 18,750 psi. As stated above the connector was applied to a skived hose and first internally expanded. Then the connector was externally swaged twice by two successive smaller dies. The test was conducted by an independent laboratory and witnessed by two of the inventors. They noted that there was no movement of the end connector and that the hose burst three feet from the fitting (end connector).

The actual end connector was designed to withstand a hose burst pressure of 24,000 psi using all of the above described factors. The biggest ID within the end connector sets the expected pump-off force within the end connector. In this particular end connector the largest ID is 3.919-inches, thereby setting the design pump-off force at 289,503 pounds$_{force}$. The ferrule must be sized to withstand this force (plus a reasonable safety factor). Thus, the design pump-off force sets the minimum wall thickness of the ferrule between the lands (the groove). This thickness is calculated using the known tensile strength of the ferrule (in the case of the test end connector the minimum tensile strength was set at 80,000 psi, i.e., only metals meeting or exceeding this strength are used).

A further test was conducted on 4-ply 4-inch ID API Grade E reinforced hose manufactured by the Taurus Emerge Company of Hungry. The test conditions were the same as for the Gates Rubber Company hose. The test hose, in this case burst at 23,150 psi (although at one point the hose pressure reached 23,350 psi). Thus, the instant device has a demonstrated force carrying capacity greater than the pressure carrying capacity of the hose itself which was an object of the invention.

Finally and very importantly, the preferred instant device will perform well with defective hose. It is known that multiple ply-reinforced hose may contain manufacturing defects (actually all reinforced hose may contain similar defects). During manufacture a ply may be out of position. That is, rather than lie next to each other, a void (filled of course with rubber) may exist between the plys; the plys may be off-center; or, one or more cables may stand out (i.e., be slightly above the other cables). These defects can and will cause failure if the defect is within or near the confines of the swaged or crimped end connector.

The reason for the failure is relatively simple and relates back to stress imposed on the plys by the end connector. If a cable or ply is out of place, that element will be compressed more than the other elements. This puts stress on the high tensile wire (cable) that results in failure. The sinusoidal wave pattern coupled with minimum relative axial displacement of the end connector during the expansion/swaging operation provides a large measure of confidence that the likelihood of further damage to the defective hose will be reduced, during attachment of the connector to the hose, when compared to the prior art end connector. No currently available swaged end connector can perform this task. A copper sleeve may be used to further build confidence that instant device will perform well.

The embodiments of the instant device and the improved alternate embodiment have been disclosed showing that the ferrule is welded to the stem. It is well known in the industry that other methods for securing the ferrule to the stem may be employed. The ferrule must transfer the pump off force to the stem, thus the ferrule may be welded to the stem (as described), the ferrule may be screwed to the stem, the fitting end of ferrule may be squeezed (during the crimping or swaging operation) into a groove formed in the stem, or the ferrule may be concentrically placed over the stem (from the fitting end) coming to rest against a ring formed in or welded to the stem. The ring technique is illustrated in FIG. 19 and the other two techniques are well known; however, in a large diameter high pressure device the preferred technique for attaching the ferrule to the stem would be by welding the ferrule to the stem or allowing the ferrule to slide up against a ring formed on the stem. This disclosure envisions all techniques and the use of a given technique for attaching the ferrule to the stem would be set by manufacturing concerns, manufacturer's preferences and the like.

There has been disclosed the best and preferred embodiments of the instant invention. Although dimensions have not been given, a person skilled in the art, knowing the material qualities of the ferrule and stem, plus the properties of the hose, may with the principals disclosed design a sinusoidal fitting so that the reinforcing wires/cables of a reinforced rubber hose will lock within the sine wave lands and nodes.

It must be noted that the word "sinusoidal" has been used throughout this disclosure to describe a sine-like wave, not a pure sine wave. Thus, this disclosure should not be limited to a pure sine or cosine wave because that type of wave is not attained—the form of the wave lock obtained within the instant device takes on the form (or shape) of a sine/cosine wave. It might be possible to obtain a pure sine/cosine wave and such possibility still falls within the claims as well as the non-pure sine wave-like lock that is disclosed. Because of the unpredictable properties of rubber and the fact that rubber creeps, the design function, in the end, must be verified by actual testing on each manufacturer's hose.

Item List

The following is supplied as an aid to examination and may be included in the disclosure at the option of the Examiner.

| | |
|---|---|
| 1. | In general a two ply hose |
| 2. | Tube |
| 3. | First (Inner) Carcass |
| 4. | Inner Ply (First Cable) |
| 5. | Outer Ply (Second Cable) |
| 6. | Second (Outer) Carcass |
| 7. | Fabric (Outer Cover) |
| 8. | |
| 9. | |
| 10. | Ferrule |
| 11. | Stem |
| 12. | Barb |
| 13. | Weld |
| 14. | Ridge (or land) PRIOR ART |
| 15. | Threads |
| 16. | Ring |
| 17. | |
| 18. | |
| 19. | |
| 20. | Ferrule |
| 21. | Stem |
| 22. | |
| 23. | Weld |
| 24. | |
| 25. | |
| 26. | |
| 27. | Low Point (Node) |
| 28. | High Point (Land) |
| 29. | |
| 30. | Ferrule |
| 31. | Stem |
| 32. | |
| 33. | |
| 34. | |
| 35. | Low Point (Groove) |
| 36. | High Point (Flute or bump) |
| 37. | Low Point (Node) |
| 38. | High Point (Land) |

-continued

| | | |
|---|---|---|
| 39. | Copper Sleeve | |
| 40. | Ferrule | |
| 41. | Stem | |
| 42. | Barb | |
| 43. | Weld | |
| 44. | Stem Transition | |
| 45. | Groove | |
| 46. | Flute | |
| 47. | Node | |
| 48. | Land | |
| 49. | Step | |
| 50. | Improved Ferrule | |
| 51. | Stem | |
| 52. | Barb | |
| 53. | | |
| 54. | Ridge (Prior Art) | |
| 55. | | |
| 56. | | |
| 57. | Node | |
| 58. | Land | |
| 59. | | |
| 60. | Ferrule | |
| 61. | Stem | |
| 62. | Barb | |
| 63. | | |
| 64. | | |
| 65. | Low Point (Groove) | |
| 66. | High Point (Flute or bump) | |
| 67. | Low Point (Node) | |
| 68. | High Point (Land) | |
| 69. | | |
| 70. | Copper Sleeve - Optional | |
| 71. | In general a four ply hose | |
| 72. | Inner tube | |
| 73. | First Carcass | |
| 74. | Inner Most Ply | |
| 75. | Next Innermost Ply | |
| 76. | Next Outermost Ply | |
| 77. | Outermost Ply | |
| 78. | Second Carcass | |
| 79. | Outer Cover | |
| 80. | Hump | |
| α | Land Slope (First) | |
| β | Second Slope | |
| γ | Flat Section | |
| δ | Third Slope | |
| ε | Flat Section | |
| a | First Section | |
| b | Tapering Section | |
| c | End Section | |
| A | Prior Art | |
| B | Waved Section | |
| C | Tapered Section | |

The invention claimed is:

1. An end connector for permanent attachment to wire reinforced rubber hose, comprising:
a stem having a coupling end, a hose end and an outside;
a ferrule secured to said stem near said coupling end wherein said ferrule has an inside and extends concentrically about said stem towards said hose end thereof; thereby forming
a circular cavity adapted to receive one end of the wire reinforced rubber hose wherein said cavity is divided into three separate areas, a first area adapted as an expansion area, a second area adapted as gripping and sealing area and a third area adapted as a stress reduction and sealing area;
wherein said first area is located at said coupling end, said third area is located at said hose end, and
said second area is located between said first area and said third area, and wherein:
said gripping and sealing area comprises a complementary set of lands and nodes within said ferrule assuming the shape of a sloped sine wave within said inside of said ferrule such that the amplitude of said land is greatest nearest said first area and is least nearest said third area and a complementary set of flutes and grooves assuming the shape of a modified sine wave on said outside of said stem, and wherein
said stress reduction and sealing area comprises a complementary set of sectionally sloped surfaces said within said ferrule wherein the slope of said sloped surfaces increases the distance between said inside of said ferrule and said outside of said stem such that the minimum distance is nearest said second area and maximum at said hose end of said ferrule and a complementary set of ridges formed on said outside of said stem.

2. An end connector for permanent attachment to cable reinforced rubber hose, comprising:
a stem having a coupling end, a hose end, an inside having an inside diameter and an outside;
a step, for controlling column buckling, formed within said inside of said stem lying along said inside of said stem and extending laterally from said hose end of said stem towards said coupling end of said stem such that said step decreases said inside diameter of said stem;
a step transition located between said hose end and said coupling end of said stem, said stem transition providing a smoothed changeover between said step and said inside diameter of said stem;
a ferrule secured to said stem near said coupling end wherein said ferrule has an inside and extends concentrically about said stem towards said hose end thereof; thereby forming
a circular cavity adapted to receive one end of the cable reinforced rubber hose wherein said cavity is divided into three separate areas, a first area adapted as an expansion area, a second area adapted as gripping and sealing area and a third area adapted as a stress reduction and sealing area; wherein
said first area is located at said coupling end,
said third area is located at said hose end, and
said second area is located between said first area and said third area, and wherein:
said gripping and sealing area comprises a complementary set of lands and nodes within said ferrule assuming the shape of a sloped sine wave within said inside of said ferrule such that the amplitude of said land is greatest nearest said first area and is least nearest said third area and a complementary set of flutes and grooves assuming the shape of a modified sine wave on said outside of said stem, and wherein
said stress reduction and sealing area comprises a complementary set of sectionally sloped surfaces said within said ferrule wherein the slope of said sloped surfaces increases the distance between said inside of said ferrule and said outside of said stem such that the minimum distance is nearest said second area and maximum at said hose end of said ferrule and a complementary set of ridges formed on said outside of said stem.

3. The end connector of claim 2 wherein before attachment the cable reinforced rubber hose is skived by removing the outer layer of rubber thereby exposing the cable reinforcement and wherein the connector is adapted to receive the cable reinforcement of the rubber hose in contact with said complementary set of lands and nodes located within said gripping and sealing area within said ferrule and further the connector is adapted to receive the cable reinforcement in contact with said complementary set of sloped surfaces located within said stress reduction and sealing area located within said ferrule.

4. An end connector permanently attached to reinforced rubber hose, comprising:
  a stem having a coupling end, a hose end and an outside;
  a ferrule secured to said stem near said coupling end wherein said ferrule has an inside and extends concentrically about said stem towards said hose end thereof thereby forming
  a circular cavity in which one end of the reinforced rubber hose is swaged wherein said cavity is divided into three separate areas, a first area adapted as an expansion area, a second area adapted as gripping and sealing area and a third area adapted as a stress reduction and sealing area; wherein
    said first area is located at said coupling end,
    said third area is located at said hose end, and
    said second area is located between said first area and said third area, and wherein:
      said gripping and sealing area comprises a complementary set of lands and nodes within said ferrule assuming the shape of a sloped sine wave within said inside of said ferrule such that the amplitude of said land is greatest nearest said first area and is least nearest said third area and a complementary set of flutes and grooves assuming the shape of a modified sine wave on said outside of said stem, and wherein
      said stress reduction and sealing area comprises a complementary set of sectionally sloped surfaces said within said ferrule wherein the slope of said sloped surfaces increases the distance between said inside of said ferrule and said outside of said stem such that the minimum distance is nearest said second area and maximum at said hose end of said ferrule and a complementary set of ridges formed on said outside of said stem.

5. The end connector of claim 4 wherein the reinforced rubber hose is skived, before permanent attachment to the end connector, by removing the outer layer of rubber thereby exposing the cable reinforcement and wherein the reinforcement of the rubber hose comes into contact with said complementary set of lands and nodes located within said gripping and sealing area within said ferrule and further comes into contact with said complementary set of sloped surfaces located within said stress reduction and sealing area located within said ferrule.

6. The end connector of claim 4 wherein said shape of said modified sine wave on said outside of said stem assumes the shape of a sloped sine wave such that the amplitude of said flute is greatest nearest said first area and is least nearest said third area.

7. The end connector of claim 1 wherein said stem further has an inside and an inside diameter and further comprising:
  a step, for controlling column buckling, formed within said inside of said stem lying along said inside of said stem and extending laterally from said hose end of said stem towards said coupling end of said stem such that said step decreases said inside diameter of said stem;
  a step transition located between said hose end and said coupling end of said stem, said stem transition providing a smoothed changeover between said step and said inside diameter of said stem.

8. The end connector of claim 5 wherein said stem has an inside having an inside diameter and further comprises:
  a step, for controlling column buckling, formed within said inside of said stem lying along said inside of said stem and extending laterally from said hose end of said stem towards said coupling end of said stem such that said step decreases said inside diameter of said stem;
  a step transition located between said hose end and said coupling end of said stem, said stem transition providing a smoothed changeover between said step and said inside diameter of said stem.

9. The end connector of claim 7 wherein said step transition lays at a point between one-third and one-half of the axial distance between said hose end and said coupling end of said stem.

10. The end connector of claim 2 wherein said step transition lays at a point between one-third and one-half of the axial distance between said hose end and said coupling end of said stem.

11. The end connector of claim 8 wherein said step transition lays at a point between one-third and one-half of the axial distance between said hose end and said coupling end of said stem.

12. The end connector of claim 1 wherein said shape of said modified sine wave on said outside of said stem assumes the shape of a sloped sine wave such that the amplitude of said flute is greatest nearest said first area and is least nearest said third area.

13. The end connector of claim 2 wherein said shape of said modified sine wave on said outside of said stem assumes the shape of a sloped sine wave such that the amplitude of the flute is greatest nearest said first area and is least nearest said third area.

14. The end connector of claim 1 wherein the wire reinforced rubber hose has a free end located within said cavity and wherein said expansion area defines means for accepting creep of the free end of the wire reinforced rubber hose.

15. The end connector of claim 2 wherein the cable reinforced rubber hose has a free end located within said cavity and wherein said expansion area defines means for accepting creep of the free end of the cable reinforced rubber hose.

16. The end connector of claim 4 wherein the cable reinforced rubber hose has a free end located within said cavity and wherein said expansion area defines means for accepting creep of the free end of the cable reinforced rubber hose during attachment.

17. The end connector of claim 1 wherein before attachment the wire reinforced rubber hose is skived by removing the outer layer of rubber thereby exposing the wire reinforcement and wherein the connector is adapted to receive the wire reinforcement of the rubber hose in contact with said complementary set of lands and nodes located within said gripping and sealing area within said ferrule and further the connector is adapted to receive the cable reinforcement in contact with said complementary set of sloped surfaces located within said stress reduction and sealing area located within said ferrule.

18. The end connector of claim 17 further having a lateral axis and wherein said complementary set of sectionally sloped surfaces said within said ferrule further comprise four surfaces located within said stress reduction and sealing area located within said ferrule, a first surface, a second surface, a third surface and a fourth surface, said first surface lying parallel to said lateral axis and located at said hose end of said ferrule, said second surface being sloped to said lateral axis at an angle DELTA and continuing from said first surface, said third surface being parallel to said lateral axis and continuing from said second surface, said fourth surface being sloped to said lateral axis at an angle BETA and continuing from said third surface to said gripping and sealing area and wherein the connector is adapted to receive the wire reinforcement of the rubber hose in contact with said second, third and fourth surfaces and wherein the connector is adapted to receive the remaining un-skived portion of the wire reinforced rubber hose in contact with said first surface.

19. The end connector of claim 3 further having a lateral axis and wherein said complementary set of sectionally sloped surfaces said within said ferrule further comprise four surfaces located within said stress reduction and sealing area located within said ferrule, a first surface, a second surface, a third surface and a fourth surface, said first surface lying parallel to said lateral axis and located at said hose end of said ferrule, said second surface being sloped to said lateral axis at an angle DELTA and continuing from said first surface, said third surface being parallel to said lateral axis and continuing from said second surface, said fourth surface being sloped to said lateral axis at an angle BETA and continuing from said third surface to said gripping and sealing area and wherein the cable reinforcement of the rubber hose comes into contact with said second, third and fourth surfaces and wherein the remaining un-skived portion of the cable reinforced rubber hose comes into contact with said first surface during attachment.

20. The end connector of claim 5 further having a lateral axis and wherein said complementary set of sectionally sloped surfaces said within said ferrule further comprise four surfaces located within said stress reduction and sealing area located within said ferrule, a first surface, a second surface, a third surface and a fourth surface, said first surface lying parallel to said lateral axis and located at said hose end of said ferrule, said second surface being sloped to said lateral axis at an angle DELTA and continuing from said first surface, said third surface being parallel to said lateral axis and continuing from said second surface, said fourth surface being sloped to said lateral axis at an angle BETA and continuing from said third surface to said gripping and sealing area and wherein the cable reinforcement of the rubber hose comes into contact with said second, third and fourth surfaces and wherein the remaining un-skived portion of the cable reinforced rubber hose comes into contact with said first surface during attachment.

21. The end connector of claim 18 where said angles DELTA and BETA are about 8 and 4 degrees respectively.

22. The end connector of claim 19 where said angles DELTA and BETA are about 8 and 4 degrees respectively.

23. The end connector of claim 20 where said angles DELTA and BETA are about 8 and 4 degrees respectively.

* * * * *